(12) United States Patent
Saito et al.

(10) Patent No.: US 10,393,879 B2
(45) Date of Patent: Aug. 27, 2019

(54) GLOBAL POSITIONING DEVICE

(71) Applicant: MITSUBISHI ELECTRIC CORPORATION, Chiyoda-ku (JP)

(72) Inventors: Masayuki Saito, Tokyo (JP); Masakazu Miya, Tokyo (JP); Yuki Sato, Tokyo (JP); Seigo Fujita, Tokyo (JP); Kazuhiro Terao, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 94 days.

(21) Appl. No.: 15/127,993

(22) PCT Filed: Mar. 28, 2014

(86) PCT No.: PCT/JP2014/059099
§ 371 (c)(1),
(2) Date: Sep. 21, 2016

(87) PCT Pub. No.: WO2015/145719
PCT Pub. Date: Oct. 1, 2015

(65) Prior Publication Data
US 2017/0090038 A1    Mar. 30, 2017

(51) Int. Cl.
*G01S 19/40*    (2010.01)
*G01S 19/41*    (2010.01)
(Continued)

(52) U.S. Cl.
CPC .............. *G01S 19/41* (2013.01); *G01S 19/07* (2013.01); *G01C 21/20* (2013.01); *G01S 19/13* (2013.01); *G01S 19/44* (2013.01)

(58) Field of Classification Search
CPC .......... G01S 19/14; G01S 19/40; G01S 19/07; G01S 19/09; G01S 19/13; G01C 21/20
(Continued)

(56) References Cited

U.S. PATENT DOCUMENTS 5,563,917 A * 10/1996 Sheynblat ............... G01S 19/07
342/358
5,796,773 A *  8/1998 Sheynblat ............... G01S 19/32
342/357.44
(Continued)

FOREIGN PATENT DOCUMENTS

JP    2001-116820 A    4/2001
JP    2002-323552 A    11/2002
(Continued)

OTHER PUBLICATIONS

Extended European Search Report dated Mar. 1, 2018 in European Patent Application No. 14886896.1, 19 pages.
(Continued)

*Primary Examiner* — Chuong P Nguyen
(74) *Attorney, Agent, or Firm* — Oblon, McClelland, Maier & Neustadt, L.L.P.

(57) ABSTRACT

A correction data creation unit receives a value of an error used in satellite positioning at a first time interval, and receives a correction value of the error at a second time interval that is a time interval 1/n (n is an integer of two or larger) time interval of the first time interval. The correction data creation unit also corrects the value of the error at the second time interval by using the correction value.

14 Claims, 24 Drawing Sheets

(51) Int. Cl.
*G01S 19/07* (2010.01)
*G01S 19/13* (2010.01)
*G01C 21/20* (2006.01)
*G01S 19/44* (2010.01)

(58) Field of Classification Search
USPC ............ 342/357.23, 357.24, 357.44, 357.46, 342/357.51
See application file for complete search history.

(56) References Cited

U.S. PATENT DOCUMENTS

| | | | |
|---|---|---|---|
| 5,914,685 A | 6/1999 | Kozlov et al. | |
| 6,229,479 B1 | 5/2001 | Kozlov et al. | |
| 6,397,147 B1* | 5/2002 | Whitehead | G01S 19/41 342/357.24 |
| 6,407,700 B1* | 6/2002 | Giffard | G01S 19/235 342/357.25 |
| 6,917,330 B2* | 7/2005 | Ohmura | G01S 19/28 342/357.29 |
| 7,439,908 B1 | 10/2008 | Zhodzishsky et al. | |
| 7,522,099 B2* | 4/2009 | Zhodzishsky | G01C 21/00 342/357.24 |
| 7,710,316 B1 | 5/2010 | Zhodzishsky et al. | |
| 7,728,768 B2 | 6/2010 | Mitsunaga | |
| 7,884,759 B2 | 2/2011 | Mitsunaga | |
| 7,961,143 B2 | 6/2011 | Dai et al. | |
| 8,035,552 B2 | 10/2011 | Dai et al. | |
| 8,130,143 B2* | 3/2012 | Liu | G01S 19/44 342/357.44 |
| 8,242,953 B2 | 8/2012 | Dai et al. | |
| 8,760,343 B2 | 6/2014 | Milyutin et al. | |
| 8,760,344 B2* | 6/2014 | Mercier | G01S 19/07 342/357.44 |
| 9,170,335 B2* | 10/2015 | Chen | G01S 19/07 |
| 2007/0052583 A1* | 3/2007 | Zhodzishsky | G01C 21/00 342/357.24 |
| 2008/0297408 A1* | 12/2008 | Dai | G01S 19/55 342/357.38 |
| 2009/0102708 A1* | 4/2009 | Dai | G01S 19/41 342/357.24 |
| 2011/0115669 A1 | 5/2011 | Milyutin et al. | |
| 2011/0187590 A1* | 8/2011 | Leandro | G01S 19/40 342/357.27 |
| 2011/0279313 A1* | 11/2011 | Joo | G01S 19/235 342/357.51 |
| 2014/0240172 A1 | 8/2014 | Milyutin et al. | |
| 2016/0011314 A1* | 1/2016 | Chen | G01S 19/07 342/357.27 |
| 2017/0131408 A1* | 5/2017 | Saito | G01S 19/22 |
| 2017/0269217 A1* | 9/2017 | Saito | G01S 19/07 |
| 2018/0113473 A1* | 4/2018 | Webber | E02F 9/2045 |

FOREIGN PATENT DOCUMENTS

| | | |
|---|---|---|
| JP | 2005-233714 A | 9/2005 |
| JP | 2006-105721 A | 4/2006 |
| JP | 2008-292454 A | 12/2008 |
| JP | 2009-243940 A | 10/2009 |
| JP | 2009-257802 A | 11/2009 |
| JP | 2009-294067 A | 12/2009 |
| JP | 2010-112724 A | 5/2010 |
| JP | 2010-528321 A | 8/2010 |
| JP | 2013-511038 A | 3/2013 |
| JP | 2013-148524 A | 8/2013 |
| JP | 2014-16315 A | 1/2014 |
| JP | 2014/153087 A | 8/2014 |
| WO | WO 2008/150389 A1 | 12/2008 |
| WO | 2009/028929 A1 | 3/2009 |
| WO | 2012/114620 A1 | 8/2012 |

OTHER PUBLICATIONS

George Chia Liu, et al., "Ionosphere Weighted GPS Cycle Ambiguity Resolution", Proceedings of the 2002 National Technical Meeting of the Institute of Navigation, ION NTM 2002, XP056004759, Jan. 30, 2002, pp. 889-899.

Dennis Odijk, "Fast Precise GPS Positioning in the presence of ionospheric delays", Delft University of Technology, XP055454008, Dec. 17, 2002, pp. 1-242 with cover pages.

Partial Supplementary European Search Report dated Jan. 3, 2018 in Patent Application No. 14886896.1, 16 pages.

Extended European Search Report dated Jan. 2, 2018 in Patent Application No. 14886890.4, 12 pages.

Masayuki Saito, et al. "Centimeter-class Augmentation System Utilizing Quasi-Zenith Satellite System", 24th International Technical Meeting of the Satellite Division of The Institute of Navigation, XP056000869, 2011, pp. 1243-1253.

Per Enge, et al. "Wide Area Augmentation of the Global Positioning System", Proceeding of the IEEE, vol. 84, No. 8, XP011043736, 1996, pp. 1063-1088.

Mark Caissy, et al. "Coming Soon: The International GNSS Real-Time Service", GPS World, vol. 23, No. 6, XP055435899, 2012, pp. 52-58.

Office Action dated Mar. 26, 2018 in Australian Patent Application No. 2014388688, 5 pages.

Office Action dated Jun. 10, 2017 in Australian Patent Application No. 2014388688.

Office Action dated Jun. 27, 2017 in Australian Patent Application No. 2014388689.

Australian Office Action dated Nov. 7, 2017 in Australian Patent Application No. 2014388688.

Office Action dated Mar. 28, 2017 in Japanese Patent Application No. 2016-509817 (with English language translation).

Office Action dated Mar. 28, 2017 in Japanese Patent Application No. 2016-509818 (with English language translation).

International Search Report dated Jul. 1, 2014 in PCT/JP2014/059099 filed Mar. 28, 2014.

Extended European Search Report dated Dec. 19, 2018 in Patent Application No. 18191453.2.

Frank Kleijer, "Troposphere Modeling and Filtering for Precise GPS Leveling", https://repository.tudelft.nl/islandora/object/uuid%3Aealf0cf0-4e48-42lb-b7ae-4ae3e36d1880, XP055531031, Apr. 2004, 281 pages.

Pawel Welgosz, "Quality assessment of GPS rapid static positioning with weighted ionospheric parameters in generalized least squares", GPS Solutions, vol. 15, No. 2, XP055531056, 2011, pp. 89-99.

Australian Office Action dated Oct. 5, 2018 in Australian Patent Application No. 2018200386, 4 pages.

Office Action dated May 31, 2018 in Australian Patent Application No. 2014388688.

Ziyi Jiang, et al., "Multi-Constellation GNSS Multipath Mitigation Using Consistency Checking", Proceedings of the 24th International Technical Meeting of the Satellite Division of the Institute of Navigation, Sep. 2011, pp. 3889-3902.

Office Action issued in corresponding Australian Application No. 2018200386 dated Mar. 8, 2019, 4 pages.

Office Action issued in corresponding European Application No. 14 886 890.4 dated Mar. 13, 2019, 6 pages.

* cited by examiner

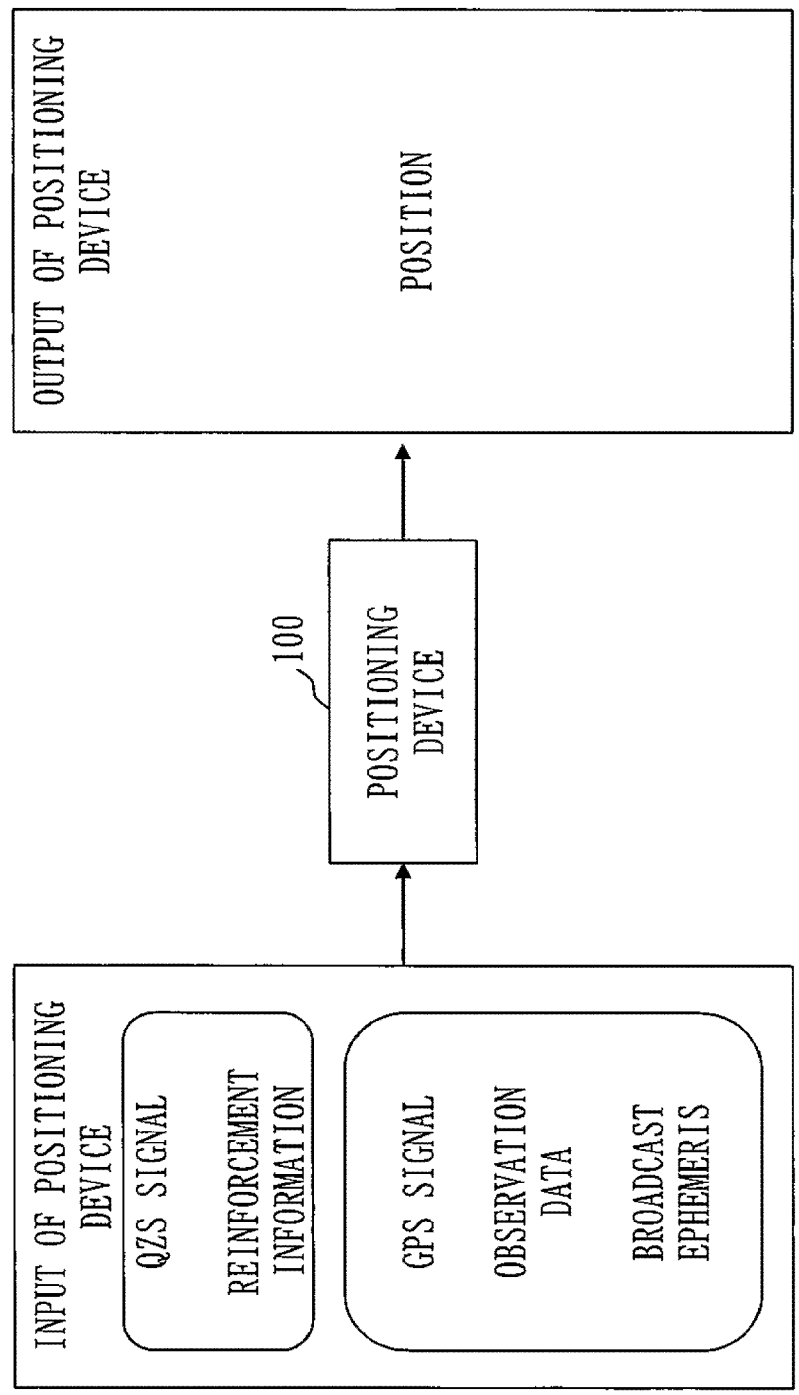

Fig. 3

| No | INPUT/OUTPUT DATA | DATA UPDATE CYCLE DATA OUTPUT CYCLE | DESCRIPTION |
|---|---|---|---|
| 1 | OBSERVATION DATA | 0.1~1.0sec | DISTANCE BETWEEN SATELLITE AND POSITIONING POINT (ANTENNA POSITION) |
| 2 | BROADCAST EPHEMERIS (EPHEMERIS) | ABOUT 2 H | DATA USED TO CALCULATE SATELLITE POSITION |
| 3 | REINFORCEMENT INFORMATION | TWO TYPES : 5, 30sec | DATA USED TO CALCULATE ERROR INCLUDED IN OBSERVATION DATA RECEIVED AT POSITIONING POINT |
| 4 | POSITION | EQUAL TO OBSERVATION DATA | ABSOLUTE POSITION (ACCURATE ON THE ORDER OF CM) OF POSITIONING POINT CALCULATED BY POSITIONING DEVICE ON THE BASIS OF No. 1 TO 3 |

Fig. 4

| | L1 WAVE FREQUENCY WAVELENGTH λ (1) = ABOUT 19 cm | L2 WAVE FREQUENCY WAVELENGTH λ (2) = ABOUT 24 cm | DESCRIPTION |
|---|---|---|---|
| PSEUDORANGE [m] | PSEUDORANGE FOR L1 WAVE OF SATELLITE i (HEREINAFTER DENOTED AS P (i, 1)) | PSEUDORANGE FOR L2 WAVE OF SATELLITE i (HEREINAFTER DENOTED AS P (i, 2)) | REPRESENTS DISTANCE BETWEEN SATELLITE AND POSITIONING POINT, WHERE "PSEUDO" INDICATES THAT VARIOUS TYPES OF BIAS ERRORS ARE INCLUDED. NOISE OTHER THAN BIAS ERRORS HAS MAGNITUDE ON THE ORDER OF METERS. |
| CARRIER PHASE [cycle] | CARRIER PHASE FOR L1 WAVE OF SATELLITE i (HEREINAFTER DENOTED AS Φ (i, 1)) | CARRIER PHASE FOR L2 WAVE OF SATELLITE i (HEREINAFTER DENOTED AS Φ (i, 2)) | MULTIPLIED BY WAVELENGTH TO REPRESENT DISTANCE BETWEEN SATELLITE AND POSITIONING POINT. HAS ROUGHLY THE SAME TYPE OF BIAS ERROR AS PSEUDORANGE, BUT ALSO INCLUDES UNKNOWN BIAS ERROR (HEREINAFTER CALLED AMBIGUITY*) RESULTING FROM RECEIVER CORRESPONDING TO INTEGER WAVELENGTH. NOISE OTHER THAN BIAS ERROR HAS MAGNITUDE ON THE ORDER OF MILLIMETERS. * MAGNITUDE OF AMBIGUITY VARIES FOR EACH SATELLITE SIGNAL BUT DOES NOT VARY WHILE THE SAME SATELLITE SIGNAL CONTINUES TO BE RECEIVED. |

Fig. 6

ERRORS OF GPS SIGNAL

| REINFORCEMENT INFORMATION | HIGH RATE (UPDATED EVERY FIVE SECONDS) (FREQUENCY-INDEPENDENT ERROR) | LOW RATE (UPDATED EVERY 30 SECONDS) (FREQUENCY-DEPENDENT ERROR) |
|---|---|---|
| NO SPATIAL FLUCTUATION | · SATELLITE CLOCK ERROR<br>· SATELLITE ORBIT ERROR*<br>· INTER-FREQUENCY BIAS*<br>(L0 BIAS, ISB) | INTER-FREQUENCY BIAS<br>(L1 AND L2 BIAS, ISB) |
| HAS SPATIAL FLUCTUATION | TROPOSPHERIC DELAY ERROR*<br>* UPDATED EVERY FIVE SECONDS BY CONSISTENCY | IONOSPHERIC DELAY ERROR |

$$L0 \; BIAS = \frac{F_1^2}{F_1^2 - F_2^2}(L1 \; BIAS) - \frac{F_2^2}{F_1^2 - F_2^2}(L2 \; BIAS) \cdots \text{EXPRESSION 1}$$

F1 AND F2 REPRESENT FREQUENCIES OF L1 AND L2 WAVES

NOT INCLUDED IN CORRECTION DATA
· RECEIVER CLOCK ERROR
· RECEIVER NOISE (PSEUDORANGE ON THE ORDER OF METERS, PHASE ON THE ORDER OF MILLIMETERS), MULTIPATH
· AMBIGUITY (ONLY FOR PHASE)

NOT INCLUDED IN REINFORCEMENT INFORMATION
· PHASE WIND UP EFFECT
· EARTH TIDE EFFECT

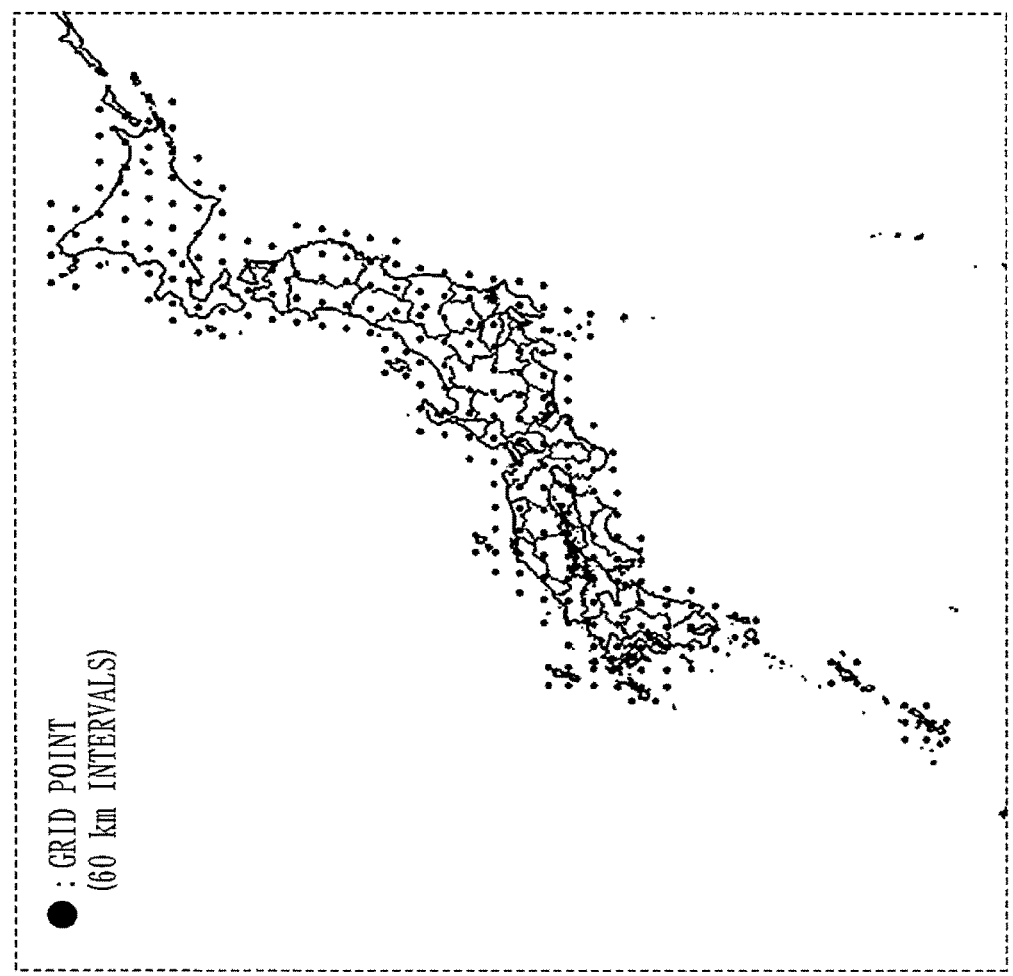

Fig. 9

| No | COMPONENT | DESCRIPTION | NOTE |
|---|---|---|---|
| 101 | APPROXIMATE POSITION/SATELLITE POSITION CALCULATION UNIT | CALCULATE APPROXIMATE POSITION OF POSITIONING POINT AND POSITION OF EACH SATELLITE | APPROXIMATE POSITION IS CALCULATED BY INDEPENDENT POSITIONING |
| 102 | CORRECTION DATA CREATION UNIT | CREATE CORRECTION DATA FROM REINFORCEMENT INFORMATION, APPROXIMATE POSITION, AND SATELLITE POSITION | |
| 103 | OBSERVATION DATA SCREENING UNIT | ELIMINATE OBSERVATION DATA EXPECTED TO BE DEGRADED IN QUALITY | |
| 104 | OBSERVATION DATA ERROR CORRECTION UNIT | CALCULATE DOUBLE DIFFERENCE DATA OF OBSERVATION DATA | REFER TO SECTION 4.2.1 |
| 105 | TIME EXTRAPOLATION CALCULATION UNIT | ESTIMATE STATE QUANTITY $X^-(t)$ OF CURRENT TIME FROM STATE QUANTITY $X^+(t - \Delta t)$ OF PREVIOUS TIME $X^-(t-\Delta t) = \Phi \cdot X(t)$ | $\Phi$ IS DETERMINED ACCORDING TO DYNAMIC MODEL IN MATRIX. REFER TO SECTION 4.2.2 FOR DETAIL |
| 106 | GEOMETRIC DISTANCE CALCULATION UNIT | CALCULATE GEOMETRIC DISTANCE | |
| 107 | RESIDUAL CALCULATION UNIT | CALCULATE DOUBLE DIFFERENCE RESIDUAL FROM DOUBLE DIFFERENCE DATA AND GEOMETRIC DISTANCE | |
| 108 | OBSERVATION UPDATE CALCULATION UNIT | UPDATE STATE QUANTITY SUCH THAT ESTIMATED ERROR OF STATE QUANTITY IS THE SMALLEST | REFER TO SECTION 4.2.2 FOR DETAIL |
| 109 | AMBIGUITY CALCULATION UNIT | CALCULATE AMBIGUITY BEING BIAS ERROR OF CARRIER PHASE UPDATE STATE QUANTITY ON THE BASIS OF CALCULATION RESULT | |

Fig. 10

| No | INTERMEDIATE DATA | DESCRIPTION | NOTE |
|---|---|---|---|
| 151 | APPROXIMATE POSITION | POSITION OF POSITIONING POINT THAT IS CALCULATED BY INDEPENDENT POSITIONING AND ACCURATE ON THE ORDER OF METERS | |
| 152 | SATELLITE POSITION | POSITION OF EACH SATELLITE TRANSMITTING OBSERVATION DATA | |
| 153 | CORRECTION DATA | ERROR EXPECTED TO BE INCLUDED IN OBSERVATION DATA RECEIVED AT POSITIONING POINT FROM EACH SATELLITE | REFER TO SECTION 4.2.1 |
| 154 | DOUBLE DIFFERENCE DATA | AMOUNT OBTAINED BY SUBTRACTING OBSERVATION DATA OF MASTER SATELLITE FROM OBSERVATION DATA OF SLAVE SATELLITE | |
| 155 | GEOMETRIC DISTANCE | DISTANCE BETWEEN POSITIONING POINT AND SATELLITE CALCULATED FROM POSITION OF POSITIONING POINT AND SATELLITE POSITION | |
| 156 | DOUBLE DIFFERENCE RESIDUAL | DOUBLE DIFFERENCE AMOUNT CALCULATED BY RESIDUAL (i) = DOUBLE DIFFERENCE DATA - STATE QUANTITY | REFER TO SECTION 4.2.1 |

Fig. 15

| SYMBOL | NAME | DESCRIPTION | SUPPLEMENTAL INFORMATION |
|---|---|---|---|
| x | STATE QUANTITY VECTOR | QUANTITY ESTIMATING POSITION/VELOCITY AND THE LIKE | (−) INDICATES PREVIOUS EPOCH, AND (+) INDICATES CURRENT EPOCH |
| P | ERROR COVARIANCE MATRIX | COVARIANCE MATRIX OF ESTIMATED ERROR OF STATE QUANTITY | NO HAT/HAT INDICATE BEFORE/AFTER OBSERVATION IS UPDATED |
| Q | PROCESS NOISE MATRIX | ERROR IN DYNAMIC MODEL | DESIGN VALUE |
| Φ | TRANSITION MATRIX | MATRIX REPRESENTING TEMPORAL TRANSITION OF STATE QUANTITY | DETERMINED BY DYNAMIC MODEL ADOPTED |
| y | OBSERVATION AMOUNT VECTOR | OBSERVATION DATA = GPS SIGNAL | |
| R | OBSERVATION NOISE MATRIX | MATRIX REPRESENTING NOISE IN OBSERVATION DATA | DESIGN VALUE |
| H | OBSERVATION MATRIX | MATRIX REPRESENTING RELATIONSHIP BETWEEN STATE QUANTITY AND OBSERVATION AMOUNT | DETERMINED BY OBSERVATION MODEL ADOPTED |

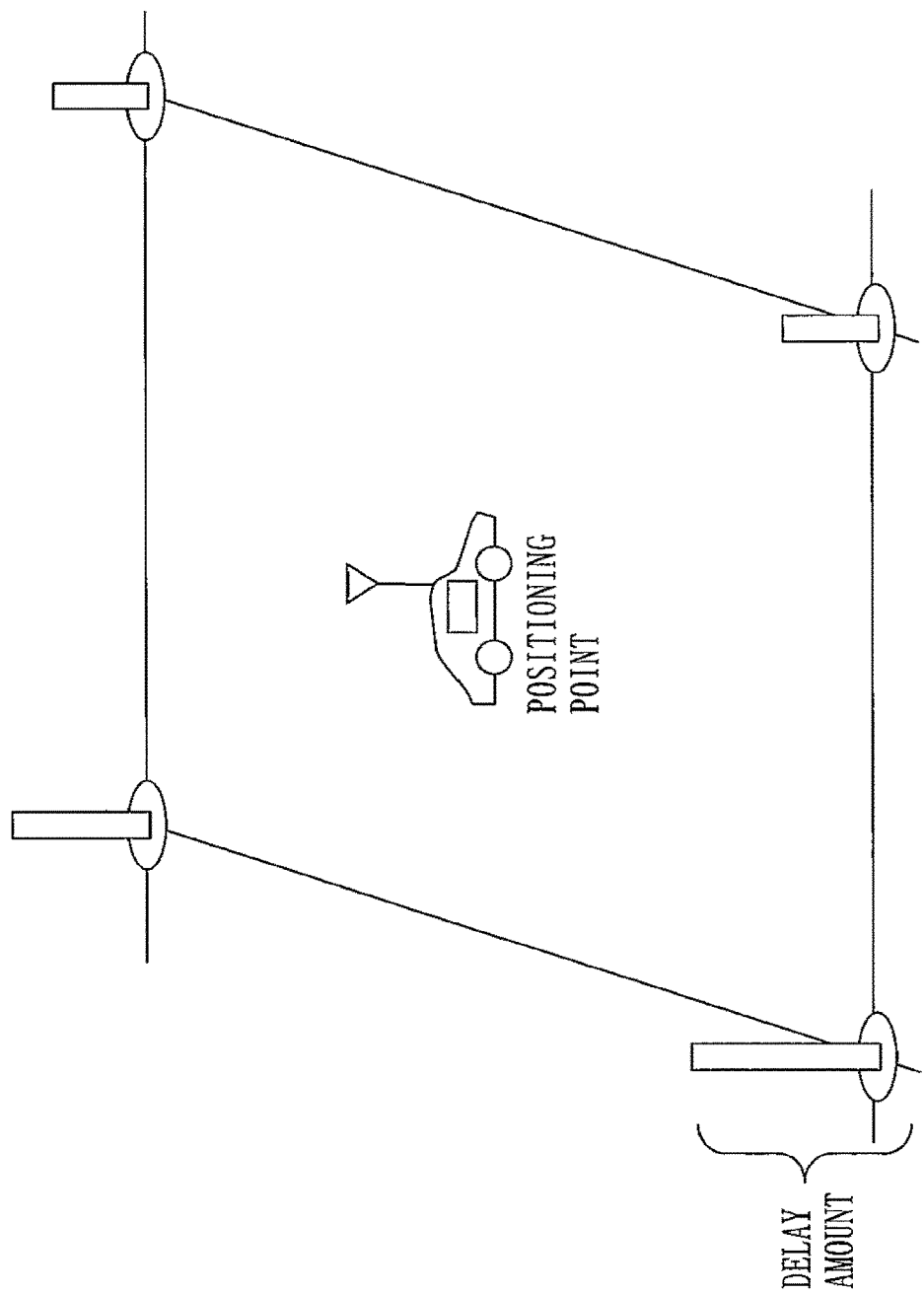

Fig. 19

| | L1 AMBIGUITY N(i, 1) | L2 AMBIGUITY N(i, 2) | WIDE-LANE AMBIGUITY N(i, wl) =N(i, 1) −N(i, 2) |
|---|---|---|---|
| FREQUENCY | 1575.42 [MHz] | 1227.60 [MHz] | 1575.42 − 1227.60 =347.82 [MHz] |
| WAVELENGTH | ABOUT 19 cm | ABOUT 24 cm | ABOUT 86 cm |

Fig. 20

$$X(t) = (\text{POSITION, VELOCITY, L1– WAVE AMBIGUITY, L2– WAVE AMBIGUITY})$$
$$= ((x\ y\ z)\ (v_x\ v_y\ v_z)\ (N(1,1)\ \wedge\ N(i,1)\ \wedge\ N(n,1))\ (N(1,2)\ \wedge\ N(i,2)\ \wedge\ N(n,2)))$$

$$X(t) = \begin{pmatrix} \text{POSITION, VELOCITY, L1– WAVE AMBIGUITY, WL AMBIGUITY,} \\ \text{IONOSPHERIC RESIDUAL, TROPOSPHERIC RESIDUAL} \end{pmatrix}$$
$$= ((x\ y\ z)(v_x\ v_y\ v_z)$$
$$(N(1,1)\ \wedge\ N(i,1)\ \wedge\ N(i,1))(N(1,wl)\ \wedge\ N(i,wl)\ \wedge\ N(n,wl))$$
$$(resI(1)\ \wedge\ resI(i)\ \wedge\ resI(n))(resT_d\ resT_w))$$

Fig. 21

| DYNAMIC MODEL (*1) TRANSITION MATRIX (Φ) | CONVENTIONAL TECHNIQUE | SECOND EMBODIMENT |
|---|---|---|
| | POSITION AND VELOCITY: FIRST ORDER MARKOV PROCESS<br>AMBIGUITY: RANDOM WALK | POSITION AND VELOCITY: FIRST ORDER MARKOV PROCESS<br>AMBIGUITY: RANDOM WALK<br>IONOSPHERIC RESIDUAL: GAUSS-MARKOV PROCESS<br>TROPOSPHERIC RESIDUAL: GAUSS-MARKOV PROCESS |

(*1) REFER TO FOLLOWING LITERATURE REGARDING EACH DYNAMIC MODEL
「Applied Optimal Estimation」by A. Gelb, The MIT Press

Fig. 22

OBSERVATION MODEL FOR
PSEUDORANGE: $\quad \Delta\nabla P(i,f) = \rho(i) - \rho(j \neq i) + \varepsilon_P(f)$ ···EXPRESSION 4

OBSERVATION MODEL FOR
CARRIER PHASE: $\quad \lambda(f) \times \Delta\nabla\Phi(i,f) = \rho(i) - \rho(j \neq i) + \lambda(f) \times N(i,f) + \varepsilon_\Phi(f)$ ···EXPRESSION 5

$\rho(i) = \sqrt{(X_i - x)^2 + (Y_i - y)^2 + (Z_i - z)^2}\quad$ REPRESENTS GEOMETRIC DISTANCE (1202 IN FIG. 12), $(X_i, Y_i, Z_i)$ REPRESENTS POSITION OF SATELLITE i, $\varepsilon_\Phi(f)$ AND $\varepsilon_\Phi(f)$
REPRESENT RECEIVER NOISE (1204 IN FIG. 12), AND AMBIGUITY $N(i,f)$ IS INDICATED BY REFERENCE NUMERAL
1205 IN FIG. 12

Fig. 23

L1-WAVE PSEUDORANGE :
$$\nabla \Delta P(i,1) = \rho(i) - \rho(j \neq i) + resI(i) + resT_d \cdot (m_d(i) - m_d(j \neq i)) + resT_w \cdot (m_w(i) - m_w(j \neq i)) + \varepsilon_P(1)$$

L2-WAVE PSEUDORANGE :
$$\nabla \Delta P(i,2) = \rho(i) - \rho(j \neq i) + \frac{F(1)^2}{F(2)^2} resI(i) + resT_d \cdot (m_d(i) - m_d(j \neq i)) + resT_w \cdot (m_w(i) - m_w(j \neq i)) + \varepsilon_P(2)$$

L1-WAVE CARRIER PHASE :
$$\lambda(1) \times \nabla \Delta \Phi(i,1) = \rho(i) - \rho(j \neq i) + \lambda(1) \times N(i,1) - resI(i) + resT_d \cdot (m_d(i) - m_d(j \neq i)) + resT_w \cdot (m_w(i) - m_w(j \neq i)) + \varepsilon_\Phi(1)$$

L2-WAVE CARRIER PHASE :
$$\lambda(2) \times \nabla \Delta \Phi(i,2) = \rho(i) - \rho(j \neq i) + \lambda(2) \times N(i,1) - \lambda(2) \times N(i,WL)$$
$$- \frac{F(1)^2}{F(2)^2} resI(i) + resT_d \cdot (m_d(i) - m_d(j \neq i)) + resT_w \cdot (m_w(i) - m_w(j \neq i)) + \varepsilon_\Phi(2)$$

GLOBAL POSITIONING DEVICE

TECHNICAL FIELD

The present invention relates to a positioning device that performs satellite positioning.

BACKGROUND ART

A positioning error in each positioning scheme will be described first.

In an independent positioning scheme in which a positioning device independently determines a position by using code information of a GNSS (Global Navigation System) signal from a satellite positioning system (GNSS) such as a GPS (Global Positioning System), a positioning accuracy is on the order of meters due to an error included in the GNSS signal.

In comparison with the independent positioning scheme using the code information, a positioning scheme using carrier-level correction data realizes highly accurate positioning on the order of centimeters.

In particular, a scheme is called a network type RTK (Realtime Kinematic) scheme in which a GNSS signal is received at a plurality of electronic reference points (distributed at intervals of ten or so kilometers in Japan), the accurate positions of which are already known, to estimate an amount of error included in the GNSS signal invertedly from the known positions of the permanent GPS stations, distribute it to a user as correction data, and perforin positioning on the order of centimeters together with a GNSS signal obtained by a positioning device on the user's side.

Such positioning scheme includes a positioning reinforcement system called a FKP (Flaechen Korrekktur Punkt) scheme.

The positioning device realizes highly accurate positioning on the order of centimeters by acquiring the correction data valid in a local area around the electronic reference point closest to the device in one-to-one communication via a communication network using terrestrial waves with abundant communication capacity such as a wireless LAN (Local Area Network) or a mobile phone, and eliminating an error included in a GPS signal with the use of the correction data.

On the other hand, the highly accurate positioning on the order of centimeters is also realized in a positioning scheme that uses an artificial satellite such as a quasi-zenith satellite to distribute correction data valid in a wide area nationwide.

In this positioning scheme, the correction data is distributed from the quasi-zenith satellite to allow a positioning device to acquire the correction data even in an environment where communication via the wireless LAN or mobile phone is not available, so that the error in the GNSS signal is eliminated by using the correction data to be able to realize the highly accurate positioning on the order of centimeters.

Patent Literature 1 discloses a scheme as the positioning scheme using the quasi-zenith satellite, for example.

CITATION LIST

Patent Literature

Patent Literature 1: JP 2002-323552 A

SUMMARY OF INVENTION

Technical Problem

The correction data valid in the nationwide wide area is generated by a ground station and transmitted to the quasi-zenith satellite in the scheme using the artificial satellite, particularly the quasi-zenith satellite.

The same correction data is universally broadcast from the quasi-zenith satellite to service areas.

A user generates correction data of his own position by using the broadcasted correction data and corrects the GNSS signal to be able to perform positioning on the order of centimeters.

Here, the correction data used in the network type RTK scheme such as the conventional FKP scheme requires enormous communication capacity of approximately 2 Mbps to cover all across Japan.

The artificial satellite such as the quasi-zenith satellite has a limited communication band so that the ground station compresses the correction data to transmit it to the quasi-zenith satellite.

Distribution information including the compressed correction data and reliability information of the correction data is called reinforcement information.

The quasi-zenith satellite then broadcasts the reinforcement information to the wide area.

Therefore, in the scheme using the quasi-zenith satellite, the positioning device is required to perform error correction on the basis of the reinforcement information in which the information amount is compressed.

The present invention has been made in consideration of the aforementioned circumstances, where a main object of the present invention is to realize a positioning device that performs positioning with high accuracy (on the order of centimeters) by performing fine error correction even on the basis of the reinforcement information in which the information amount is compressed.

Solution to Problem

A positioning device according to the present invention includes:

a receiving unit to receive a value of an error used in satellite positioning at a first time interval and receive a correction value of the error at a second time interval that is 1/n (n is an integer of two or larger) time interval of the first time interval; and an error correction unit to correct the value of the error at the second time interval by using the correction value.

Advantageous Effects of Invention

According to the present invention, fine error correction can be performed at the second time interval by using the reinforcement information distributed at the first time interval to be able to realize positioning with high accuracy (on the order of centimeters).

BRIEF DESCRIPTION OF DRAWINGS

FIG. 2 is a diagram illustrating input/output of a positioning device according to the first embodiment.

FIG. 3 is a table illustrating input/output data of the positioning device according to the first embodiment.

FIG. 4 is a table illustrating observation data according to the first embodiment.

FIG. 6 is a diagram illustrating a relationship between an error in the GPS signal and reinforcement information according to the first embodiment.

FIG. 7 is a diagram illustrating a grid point according to the first embodiment.

FIG. 9 is a table illustrating elements of the positioning device according to the first embodiment.

FIG. 10 is a table illustrating intermediate data of the positioning device according to the first embodiment.

FIG. 15 is a table illustrating a vector and a matrix used in the Kalman filter according to the first embodiment.

FIG. 16 is a diagram illustrating a delay amount in a grid according to a second embodiment.

FIG. 19 is stable illustrating ambiguity according to the second embodiment.

FIG. 20 is a diagram illustrating a state quantity according to the second embodiment and a state quantity according to a conventional technique.

FIG. 21 is a table illustrating a dynamic model and a transition matrix according to the second embodiment and a dynamic model and a transition matrix according to a conventional technique.

FIG. 22 is a diagram illustrating an observation model of a pseudorange and an observation model of a carrier phase according to a conventional technique.

FIG. 23 is a diagram illustrating an observation model of a pseudorange and an observation model of a carrier phase according to the second embodiment.

DESCRIPTION OF EMBODIMENTS

First Embodiment
1. System Configuration

Figure 1:
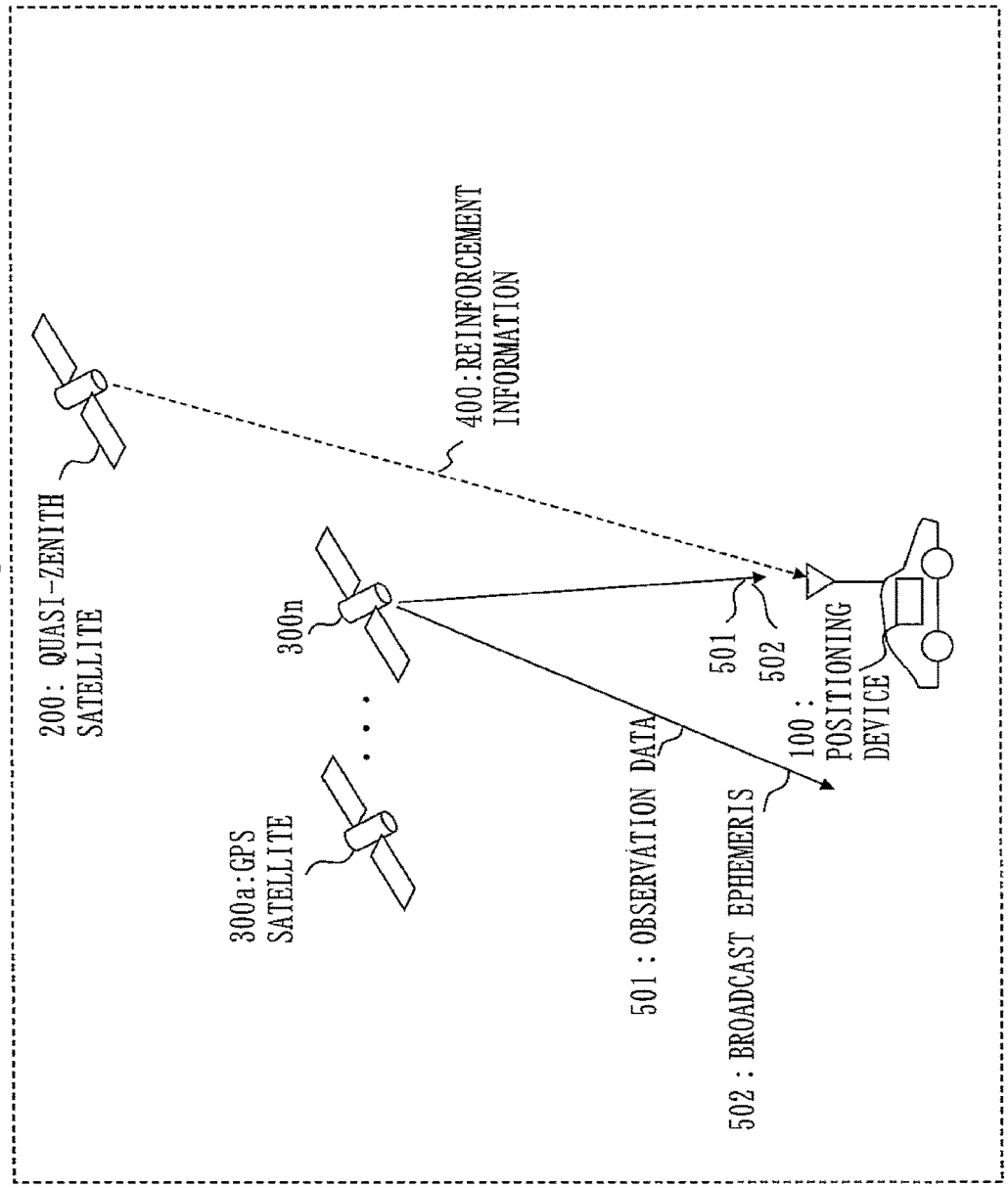
FIG. 1 is a diagram illustrating a configuration example of a positioning system according to a first embodiment.

FIG. 1 is a diagram illustrating a configuration example of a positioning system according to the present embodiment.

There will be described below an example where a quasi-zenith satellite is used in distributing reinforcement information.

A geostationary satellite such as a broadcasting satellite may be used instead of the quasi-zenith satellite, or another satellite may be used as long as it has a function of uniformly broadcasting the reinforcement information to a wide area.

Moreover, the example described below uses a GPS satellite as a positioning satellite.

Instead of the GPS satellite, there may be used a GNSS such as GLONASS, Galileo, and BeiDou or an RNSS (Regional Navigation Satellite System) such as the quasi-zenith satellite.

As illustrated in FIG. 1, a positioning device 100 is mounted to a mobile body such as an automobile.

The positioning device 100 receives observation data 501 and a broadcast ephemeris 502 transmitted from a GNSS (GPS) satellite 300.

The broadcast ephemeris 502 is also called an ephemeris.

The positioning device 100 also receives reinforcement information 400 transmitted from a quasi-zenith satellite 200 (also denoted as QZS).

An operation of the positioning device 100 will be mainly described in the present embodiment and a second embodiment.

The quasi-zenith satellite 200 receives reinforcement information from a ground station not shown in FIG. 1, and distributes the received reinforcement information as the reinforcement information 400.

The GPS satellite 300 transmits the observation data 501 and the broadcast ephemeris 502.

The positioning device 100 needs to acquire four or more of the GPS satellite 300 in order to perform positioning.

2. Overview of Operation of Positioning Device 100

Here, there will be described an overview of the operation of the positioning device 100 described in the present embodiment and the second embodiment.

As illustrated in FIG. 2, the positioning device 100 receives the observation data 501 and the broadcast ephemeris 502 as a GPS signal and the reinforcement information 400 as a QZS signal.

The positioning device 100 then uses the reinforcement information 400 as well as the observation data 501 and the broadcast ephemeris 502 to calculate the position of a positioning point (the position of the positioning device 100).

FIG. 3 illustrates the observation data 501, the broadcast ephemeris 502, the reinforcement information 400 and the position in detail.

3.1. Observation Data

A pseudorange between the positioning point and the GPS satellite 300 as well as a carrier phase can be derived from the observation data 501.

FIG. 4 illustrates the pseudorange and the carrier phase in detail.

Each of the pseudorange and the carrier phase derived from the observation data 501 includes an error.

The positioning device 100 uses the reinforcement information 400 to eliminate the error included in each of the pseudorange and the carrier phase.

Note that in the following description, a pseudorange for L1 wave of a GPS satellite i will be denoted as P(i, 1), and a pseudorange for L2 wave of the GPS satellite i will be denoted as P(i, 2).

Moreover, a carrier phase for the L1 wave of the GPS satellite i will be denoted as $\phi$(i, 1), and a carrier phase for the L2 wave of the GPS satellite i will be denoted as $\phi$(i, 2).

3.2. Reinforcement Information

Figure 5:
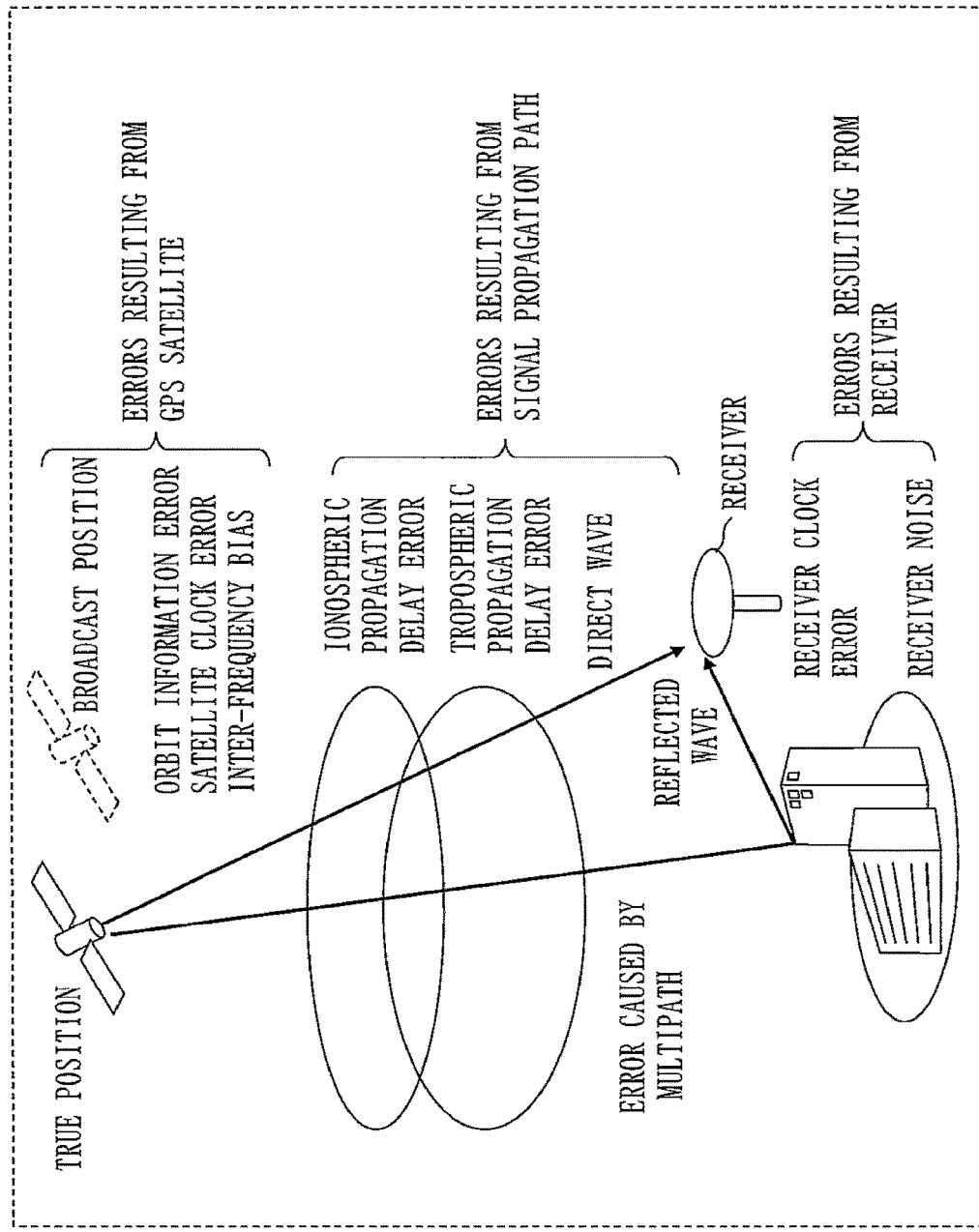
FIG. 5 is a diagram illustrating a source of error included in a GPS signal according to the first embodiment.

FIG. 5 illustrates a bias error and a noise source included in the observation data 501.

Errors resulting from the GPS satellite 300 include an orbit error, a satellite clock error, and an inter-frequency bias, and errors resulting from a signal propagation path include an ionospheric propagation delay error (also called an ionospheric delay error or an ionospheric delay amount) and a tropospheric propagation delay error (also called a tropospheric delay error or a tropospheric delay amount).

Errors resulting from a receiver of the positioning device 100 include a receiver clock error, a receiver noise and an error associated with multipath that is caused by an interference between a GPS signal reflected off a building and a GPS signal directly received from the GPS satellite 300.

Among these errors, the errors resulting from the receiver vary depending on the performance and a reception environment of the receiver of the positioning device 100 used by a user, and are thus not included in correction data and the reinforcement information but eliminated by processing of the positioning device 100.

The errors resulting from the GPS satellite 300 and the signal propagation path are compressed and distributed as the reinforcement information from the quasi-zenith satellite 200.

In addition to the errors illustrated in FIG. 5, errors resulting from an earth tide effect and a phase wind up effect that vary depending on the position of the positioning point are included in the correction data but not included in the reinforcement information.

FIG. 6 illustrates a breakdown of the reinforcement information taking the aforementioned points into consideration.

The correction data distributed from a reference point via a wireless LAN is distributed at an update cycle of one second, while the errors in the reinforcement information according to the present embodiment are classified into a high rate and a low rate according to the degree of temporal fluctuations and subjected to time compression.

More specifically, the error classified under the high rate is updated every five seconds, while the error classified under the low rate is updated every 30 seconds.

Moreover, while conventional correction data is generated at each reference point set at intervals of about 10 to 30 km and distributed, the ionospheric delay error and the tropospheric delay error (with a spatial fluctuation) resulting from the signal path and included in the reinforcement information of the present embodiment are distributed only at every grid point (FIG. 7) with a 60-km radius to be subjected to space compression.

Furthermore, in the present embodiment, the errors included in the reinforcement information are classified into an error which is dependent on frequency (a frequency-dependent error) and an error which is independent of frequency (a frequency-independent error).

The frequency-independent error is classified as the high-rate error, and the frequency-dependent error is classified as the low-rate error.

Among the frequency-independent errors, the satellite clock error alone is updated every five seconds and distributed.

The other frequency-independent errors, namely the satellite orbit error, the inter-frequency bias and the tropospheric delay error, are updated every 30 seconds and distributed.

However, for each of the satellite orbit error, the inter-frequency bias and the tropospheric delay error, a variation from the error measured every 30 seconds is added as a correction value every five seconds to the satellite clock error (updated every five seconds and distributed).

In other words, during 30 seconds, five correction values (30 seconds/5 seconds−1=5) for each of the satellite orbit error, the inter-frequency bias and the tropospheric delay error are added to the satellite clock error updated every five seconds.

As a result, the positioning device 100 can receive an updated value of each of the satellite orbit error, the inter-frequency bias and the tropospheric delay error every 30 seconds as well as receive the correction value of each of the satellite orbit error, the inter-frequency bias and the tropospheric delay error every five seconds.

The positioning device 100 then adds the correction value received every five seconds to the updated value received every 30 seconds to be able to perform correction on the satellite orbit error, the inter-frequency bias and the tropospheric delay error every five seconds.

The correction value for each of the satellite orbit error, the inter-frequency bias and the tropospheric delay error obtained every five seconds and added to the satellite clock error is also called a consistency.

Thus, in the present embodiment, the data volume of the reinforcement information is compressed by distributing the consistency every five seconds.

Note that the inter-frequency bias is based on an L1 signal and represents a delay amount within a satellite payload of each signal, where an inter-frequency bias (L1 bias) is '0' and an inter-frequency bias (L2 bias) represents a delay amount of an L2 carrier signal with respect to an L1 carrier signal 'L2−L1'.

Moreover, an inter-frequency bias (L0 bias) represents a frequency-independent term of the inter-frequency bias and is calculated from the inter-frequency bias (L1 bias) and the inter-frequency bias (L2 bias) as expressed by expression 1 in FIG. 6.

The inter-frequency bias based on the L1 signal may also be based on another signal without any problem, where the same effect can be expected when an L5 signal is used.

4. Configuration Example of Positioning Device

Figure 8:
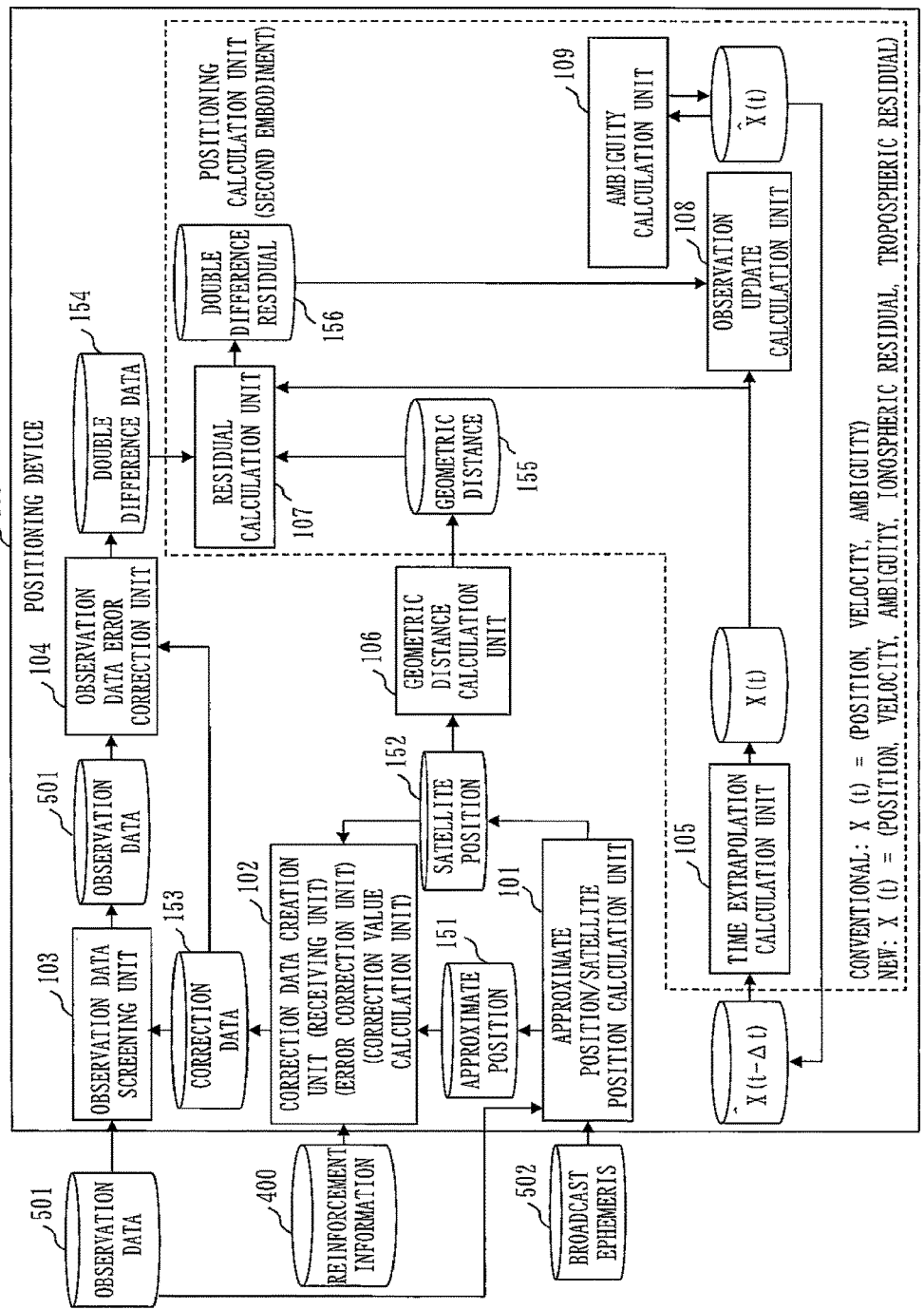
FIG. 8 is a diagram illustrating a configuration example of the positioning device according to the first embodiment.

FIG. 8 is a diagram illustrating a configuration example of the positioning device 100 according to the present embodiment.

Moreover, FIG. 9 illustrates a brief description of each component illustrated in FIG. 8, and FIG. 10 illustrates a brief description of intermediate data.

An approximate position/satellite position calculation unit 101 receives the observation data 501 and the broadcast ephemeris 502 from the GPS satellite 300 and calculates an approximate position of the positioning point and a position of each GPS satellite 300.

An approximate position 151 and a satellite position 152 are calculation results of the approximate position/satellite position calculation unit 101.

The approximate position 151 is a position of the positioning point that is calculated by independent positioning and accurate on the order of meters.

The satellite position 152 is a position of each GPS satellite 300 from which the positioning device 100 receives the observation data.

A correction data creation unit 102 receives the reinforcement information 400 from the quasi-zenith satellite 200 as well as acquires the approximate position 151 and the satellite position 152 to calculate correction data 153 from the reinforcement information 400, the approximate position 151 and the satellite position 152.

The correction data 153 indicates an error expected to be included in the observation data 501 that is received at the positioning point from each GPS satellite 300.

Note that the correction data creation unit 102 corresponds to an example of a receiving unit, an error correction unit and a correction value calculation unit.

An observation data screening unit 103 eliminates the observation data 501 that is expected to be degraded in quality.

An observation data error correction unit 104 performs double difference calculation to output double difference data 154 of the observation data.

The double difference data 154 indicates a value obtained by subtracting observation data of a master satellite (observation data already corrected by using the correction data 153) from observation data of a slave satellite (observation data already corrected by using the correction data 153).

The double difference calculation and the double difference data 154 will be described later.

A time extrapolation calculation unit 105 performs time extrapolation calculation to estimate a state quantity X(t) of a current epoch from a state quantity X^(t−Δt) of a previous epoch.

Note that notation in which "^" lies directly above "X" in FIG. 8 is identical in meaning to the notation in which "^" lies at the upper right of "X" ("X^").

Moreover, "^" indicates a state quantity after being updated by an observation update calculation unit 108 to be described.

A geometric distance calculation unit 106 calculates a geometric distance 155 from the GPS satellite 300 to the positioning point on the basis of the satellite position 152.

A residual calculation unit 107 calculates a double difference residual 156 from the double difference data 154 and the geometric distance 155.

The observation update calculation unit 108 updates the state quantity X(t) such that the state quantity X(t) has the smallest estimated error.

The state quantity X(t) after being updated by the observation update calculation unit 108 is denoted as the state quantity X^(t).

An ambiguity calculation unit 109 calculates ambiguity being a bias amount of the carrier phase and updates the state quantity X^(t) on the basis of the calculation result.

A value of the position included in the state quantity X^(t) updated by the ambiguity calculation unit 109 is output as a positioning result.

Moreover, the state quantity X^(t) updated by the ambiguity calculation unit 109 is subjected to the time extrapolation calculation by the time extrapolation calculation unit 105 as the state quantity X^(t−Δt) of the previous epoch.

Note that a range enclosed with a dashed line in FIG. 8 is called a positioning calculation unit 110.

Details of the positioning calculation unit 110 will be mainly described in a second embodiment.

4.1. Correction Data Creation Unit 102

Figure 11:
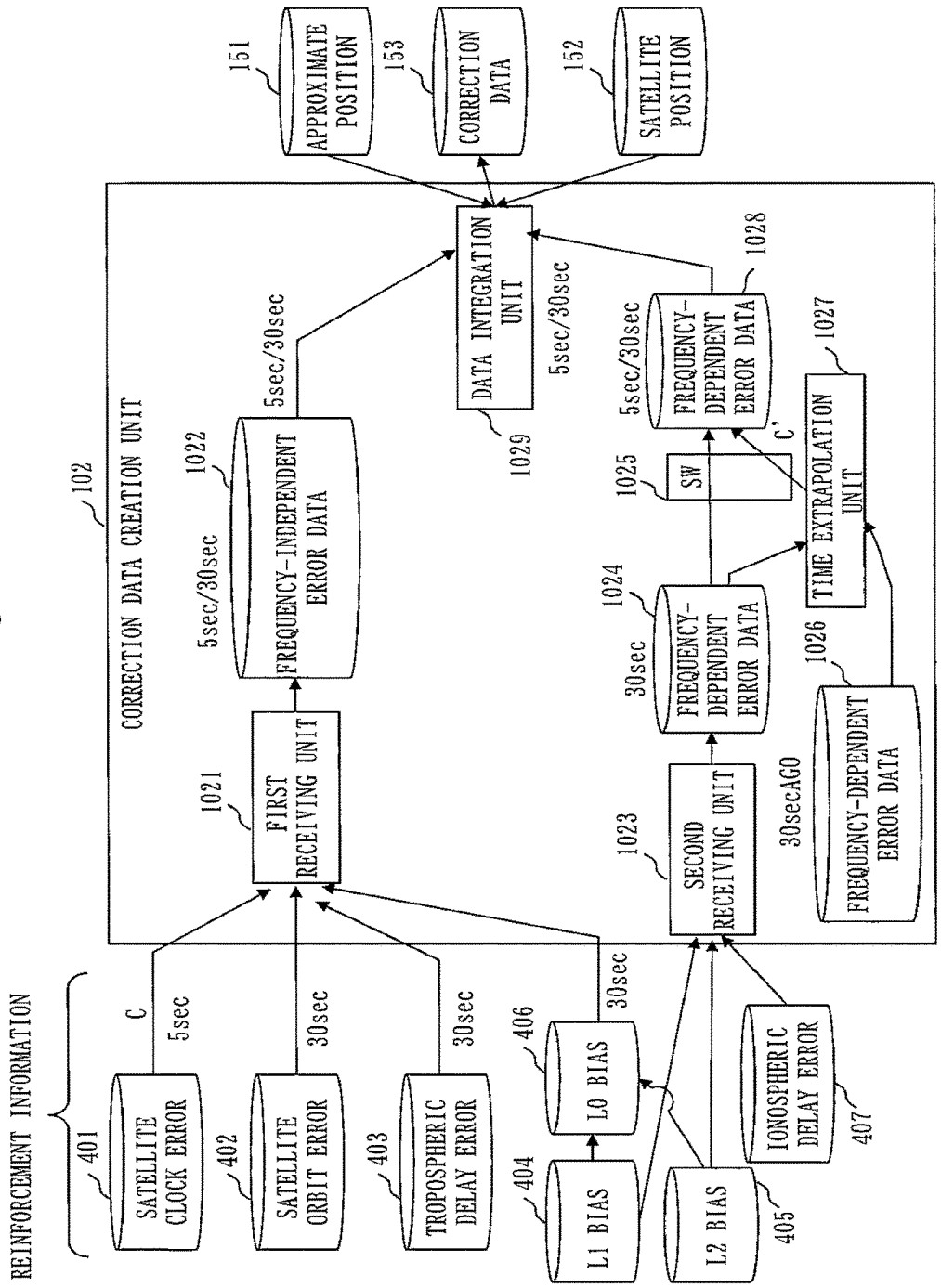
FIG. 11 is a diagram illustrating a configuration example of a correction data creation unit according to the first embodiment.

FIG. 11 illustrates a configuration example of the correction data creation unit 102.

A first receiving unit 1021 receives data on the frequency-independent errors included in the reinforcement information 400.

More specifically, the first receiving unit 1021 receives a satellite clock error 401 at five second intervals.

The satellite clock error 401 obtained every 30 seconds such as at zero second, 30 seconds, and 60 seconds does not include the consistency (denoted as "C" in FIG. 11), while the satellite clock error 401 obtained every five seconds such as at five seconds, 10 seconds, 35 seconds, 40 seconds, 65 seconds and 70 seconds includes the consistency.

The consistency included in the satellite clock error 401 is a correction value for each of a satellite orbit error 402, a tropospheric delay error 403, and an inter-frequency bias (L0 bias) 406.

Moreover, the first receiving unit 1021 receives each of the satellite orbit error 402, the tropospheric delay error 403 and the inter-frequency bias (L0 bias) 406 at 30 second intervals.

The inter-frequency bias (L0 bias) 406 is generated from an inter-frequency bias (L1 bias) 404 and an inter-frequency bias (L2 bias) 405 as described above.

The first receiving unit 1021 puts together the satellite clock error 401, the satellite orbit error 402, the tropospheric delay error 403 and the inter-frequency bias (L0 bias) 406 being received into frequency-independent error data 1022.

That is, at zero second and 30 seconds, the frequency-independent error data 1022 is made up of the satellite clock error 401 (without consistency), the satellite orbit error 402, the tropospheric delay error 403 and the inter-frequency bias (L0 bias) 406.

At five seconds and 10 seconds (35 seconds and 40 seconds), the frequency-independent error data 1022 is made up of the satellite clock error 401 (with consistency) at five seconds and 10 seconds (35 seconds and 40 seconds) as well as the satellite orbit error 402 at zero second (30 seconds), the tropospheric delay error 403 at zero second (30 seconds), and the inter-frequency bias (L0 bias) 406 at zero second (30 seconds).

Note that at five seconds and 10 seconds (35 seconds and 40 seconds), the satellite clock error 401 obtained five seconds ago is updated by the latest satellite clock error 401 (that is, the consistency obtained five seconds ago is also updated by the latest consistency).

A second receiving unit 1023 receives data on the frequency-dependent errors included in the reinforcement information 400.

More specifically, the second receiving unit 1023 receives the inter-frequency bias (L1 bias) 404, the inter-frequency bias (L2 bias) 405 and an ionospheric delay error 407 at 30 second intervals.

The second receiving unit 1023 then puts together the inter-frequency bias (L1 bias) 404, the inter-frequency bias (L2 bias) 405 and the ionospheric delay error 407 being received into frequency-dependent error data 1024.

Note that for convenience of explanation, FIG. 11 illustrates the configuration in which the first receiving unit 1021 receives the data on the frequency-independent errors included in the reinforcement information 400 while the second receiving unit 1023 receives the data on the frequency-dependent errors included in the reinforcement information 400, but a single receiving unit may be adapted to receive the whole reinforcement information to classify the received reinforcement information into the data on the frequency-independent errors and the data on the frequency-dependent errors.

A time extrapolation unit 1027 performs linear interpolation by time extrapolation using the latest frequency-dependent error data 1024 and frequency-dependent error data 1026 obtained 30 seconds ago, and estimates frequency-dependent error data for the next 30 seconds.

The time extrapolation unit 1027 then divides the estimated frequency-dependent error data for the next 30 seconds by five seconds and calculates a variation for every five seconds for each of the inter-frequency bias (L1 bias) 404, the inter-frequency bias (L2 bias) 405 and the ionospheric delay error 407.

The calculated variation for every five seconds is called time extrapolation consistency (denoted as C' in FIG. 11).

The time extrapolation consistency is a correction amount for each of the inter-frequency bias (L1 bias) 404, the inter-frequency bias (L2 bias) 405 and the ionospheric delay error 407.

At zero second and 30 seconds, frequency-dependent error data 1028 is the latest frequency-dependent error data 1024 (the inter-frequency bias (L1 bias) 404, the inter-frequency bias (L2 bias) 405, and the ionospheric delay error 407).

At five seconds and 10 seconds (35 seconds and 40 seconds), the frequency-dependent error data 1028 is made up of the frequency-dependent error data 1024 (the inter-frequency bias (L1 bias) 404, the inter-frequency bias (L2 bias) 405 and the ionospheric delay error 407) at zero second (30 seconds) and the time extrapolation consistency at five seconds and 10 seconds (35 seconds and 40 seconds).

At five seconds and 10 seconds (35 seconds and 40 seconds), the time extrapolation consistency obtained five seconds ago is updated by the latest extrapolation consistency.

A switch 1025 switches a path from the frequency-dependent error data 1024 to the frequency-dependent error data 1028 and a path from the time extrapolation unit 1027 to the frequency-dependent error data 1028.

That is, the switch 1025 enables the path from the frequency-dependent error data 1024 to the frequency-dependent error data 1028 at zero second and 30 seconds, and enables the path from the time extrapolation unit 1027 to the frequency-dependent error data 1028 at five seconds and 10 seconds (35 seconds and 40 seconds).

A data integration unit 1029 generates the correction data 153 from the frequency-independent error data 1022, the frequency-dependent error data 1028, the approximate position 151 and the satellite position 152.

The frequency-independent error data 1022 at zero second and 30 seconds is made up of the satellite clock error 401 (without consistency), the satellite orbit error 402, the tropospheric delay error 403 and the inter-frequency bias (L0 bias) 406.

The frequency-dependent error data 1028 at zero second and 30 seconds is made up of the inter-frequency bias (L1 bias) 404, the inter-frequency bias (L2 bias) 405, and the ionospheric delay error 407.

The frequency-independent error data 1022 at five seconds and 10 seconds (35 seconds and 40 seconds) is made up of the satellite clock error 401 (with consistency) at five seconds and 10 seconds (35 seconds and 40 seconds) as well as the satellite orbit error 402 at zero second (30 seconds), the tropospheric delay error 403 at zero second (30 seconds), and the inter-frequency bias (L0 bias) 406 at zero second (30 seconds).

The frequency-dependent error data 1028 at five seconds and 10 seconds (35 seconds and 40 seconds) is made up of the satellite orbit error 402, the tropospheric delay error 403 and the inter-frequency bias (L0 bias) 406 at zero second (30 seconds) as well as the time extrapolation consistency at five seconds and 10 seconds (35 seconds and 40 seconds).

At five seconds and 10 seconds (35 seconds and 40 seconds), the data integration unit 1029 corrects the satellite orbit error 402, the tropospheric delay error 403 and the inter-frequency bias (L0 bias) 406 on the basis of the consistency.

That is, the data integration unit 1029 calculates (estimates) the satellite orbit error 402, the tropospheric delay error 403 and the inter-frequency bias (L0 bias) 406 at five seconds and 10 seconds (35 seconds and 40 seconds) on the basis of the consistency in the satellite clock error 401 at five seconds and 10 seconds (35 seconds and 40 seconds) as well as the satellite orbit error 402, the tropospheric delay error 403 and the inter-frequency bias (L0 bias) 406 at zero second (30 seconds).

Likewise, at five seconds and 10 seconds (35 seconds and 40 seconds), the data integration unit 1029 corrects the inter-frequency bias (L1 bias) 404, the inter-frequency bias (L2 bias) 405 and the ionospheric delay error 407 on the basis of the time extrapolation consistency.

That is, the data integration unit 1029 calculates (estimates) the inter-frequency bias (L1 bias) 404, the inter-frequency bias (L2 bias) 405 and the ionospheric delay error 407 at five seconds and 10 seconds (35 seconds and 40 seconds) on the basis of the time extrapolation consistency at five seconds and 10 seconds (35 seconds and 40 seconds) as well as the inter-frequency bias (L1 bias) 404, the inter-frequency bias (L2 bias) 405 and the ionospheric delay error 407 at zero second (30 seconds).

As described above, the correction data creation unit 102 receives the value of the frequency-dependent error and the value of the frequency-independent error at 30 second intervals (a first time interval) and receives the consistency of the frequency-independent error at five second intervals (a second time interval).

Moreover, the correction data creation unit 102 calculates the time extrapolation consistency of the frequency-dependent error at five second intervals.

The correction data creation unit 102 then corrects the value of the frequency-independent error at five second intervals by using the received consistency, and corrects the value of the frequency-dependent error by using the calculated time extrapolation consistency.

4.2.1. Double Difference Amount

Next, there will be described double difference calculation to realize error correction processing performed by the observation data error correction unit 104.

Figure 12:
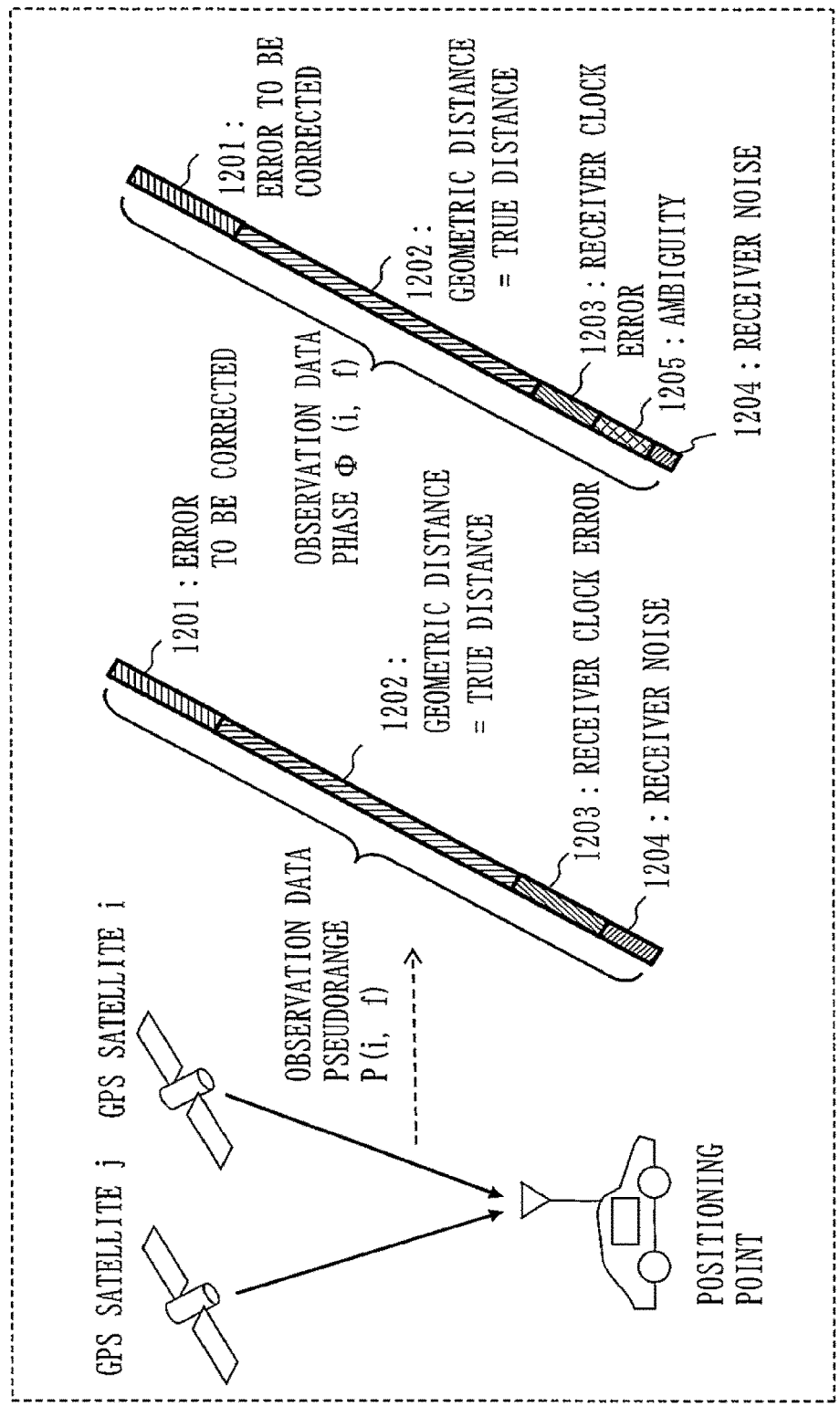
FIG. 12 is a diagram illustrating a breakdown of the observation data according to the first embodiment.
Figure 13:
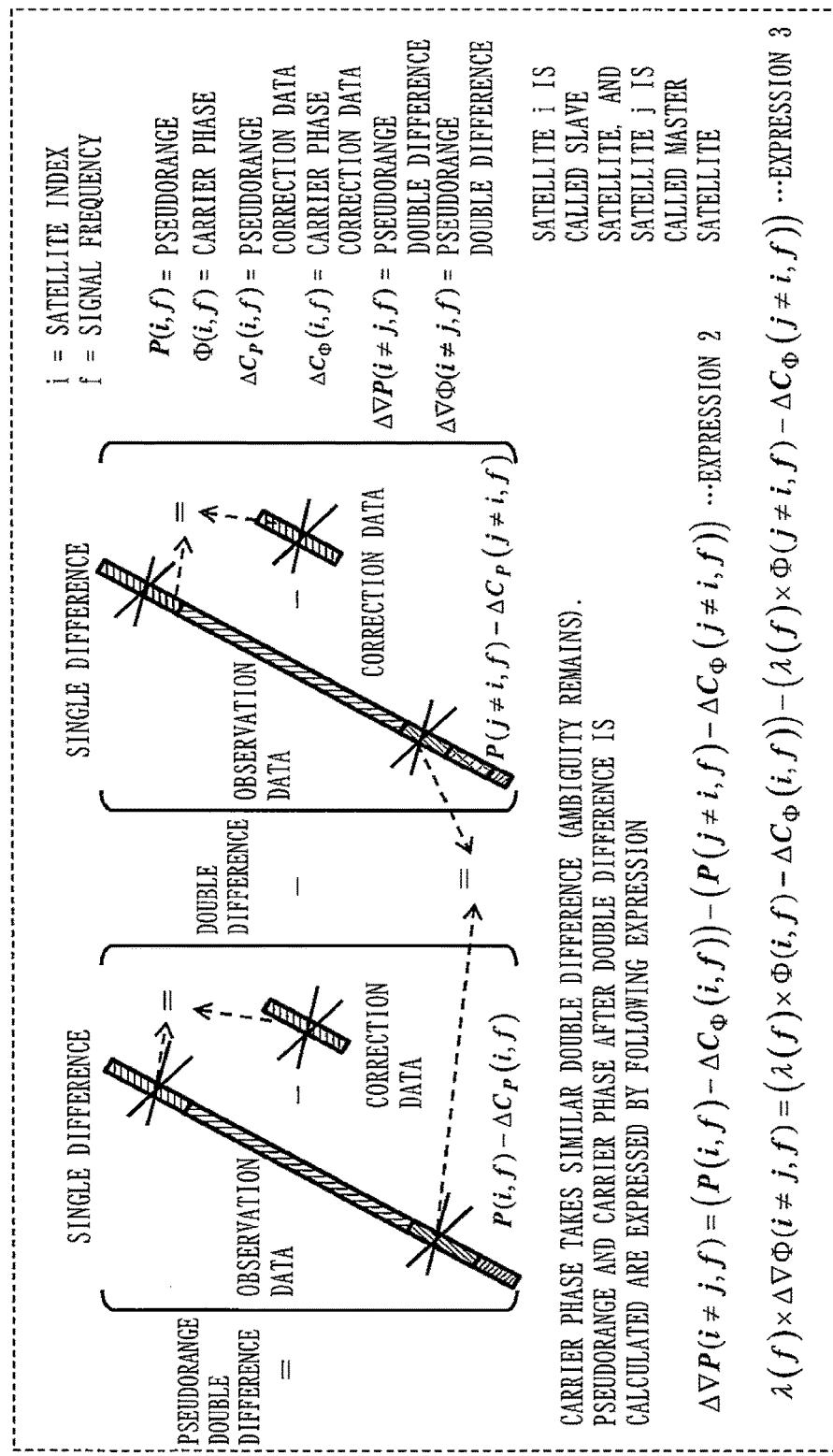
FIG. 13 is a diagram illustrating double difference calculation according to the first embodiment.

FIGS. 12 and 13 illustrate the double difference calculation.

The observation data includes the pseudorange and the carrier phase as illustrated in FIG. 4.

Each of the pseudorange and the carrier phase includes the error illustrated in section 3.2 and FIG. 6, where the error includes an amount included in the correction data (reference numeral 1201 in FIG. 12) as well as the receiver clock error (reference numeral 1203 in FIG. 12) and the receiver noise (reference numeral 1204 in FIG. 12) resulting from the receiver and not included in the correction data (the multipath is ignored in this case).

A portion obtained by eliminating all the errors is a true range (geometric distance indicated with reference numeral 1202 in FIG. 12) between the positioning point and the GPS satellite 300.

The error amount (reference numeral 1201 in FIG. 12) included in the correction data is eliminated by subtracting the correction data from the observation data (the pseudorange and the carrier phase) from each GPS satellite 300.

The error amount obtained after subtracting the correction data from the observation data (the pseudorange and the carrier phase) is called a single difference amount.

When a certain GPS satellite is determined to be a master satellite (a GPS satellite near the zenith is usually selected) and a GPS satellite other than the master satellite is determined to be a slave satellite, a single difference of the master satellite is subtracted from a single difference of the slave satellite.

As illustrated in FIG. 13, the single difference of the slave satellite and the single difference of the master satellite are a single difference of a common receiver, so that the receiver clock error (reference numeral 1203 in FIG. 12) included in the single difference of the slave satellite is equal to the receiver clock error included in the single difference of the master satellite.

Therefore, the receiver clock error (reference numeral 1203 in FIG. 12) is cancelled by subtracting the single difference of the master satellite from the single difference of the slave satellite.

An error amount obtained after eliminating the receiver clock error is called a double difference amount.

The main error is eliminated by calculating the double difference amount, and there remain the geometric distance (reference numeral 1202 in FIG. 12), the receiver noise (reference numeral 1204 in FIG. 12) and the ambiguity (reference numeral 1205 in FIG. 12, only the carrier phase).

The receiver noise equals zero when time-averaged and can thus be eliminated by performing statistical processing (Kalman filter in section 4.2.2 to be described) in the process of continuing the observation.

The ambiguity can be estimated by using the pseudorange from which the error is eliminated (refer to section 4.2.3 to be described) and, as a result, the position can be estimated with high accuracy.

4.2.2. Kalman Filter

The Kalman filter realizing the time extrapolation calculation unit 105 and the observation update calculation unit 108 in FIGS. 8 and 9 will be described.

Figure 14:
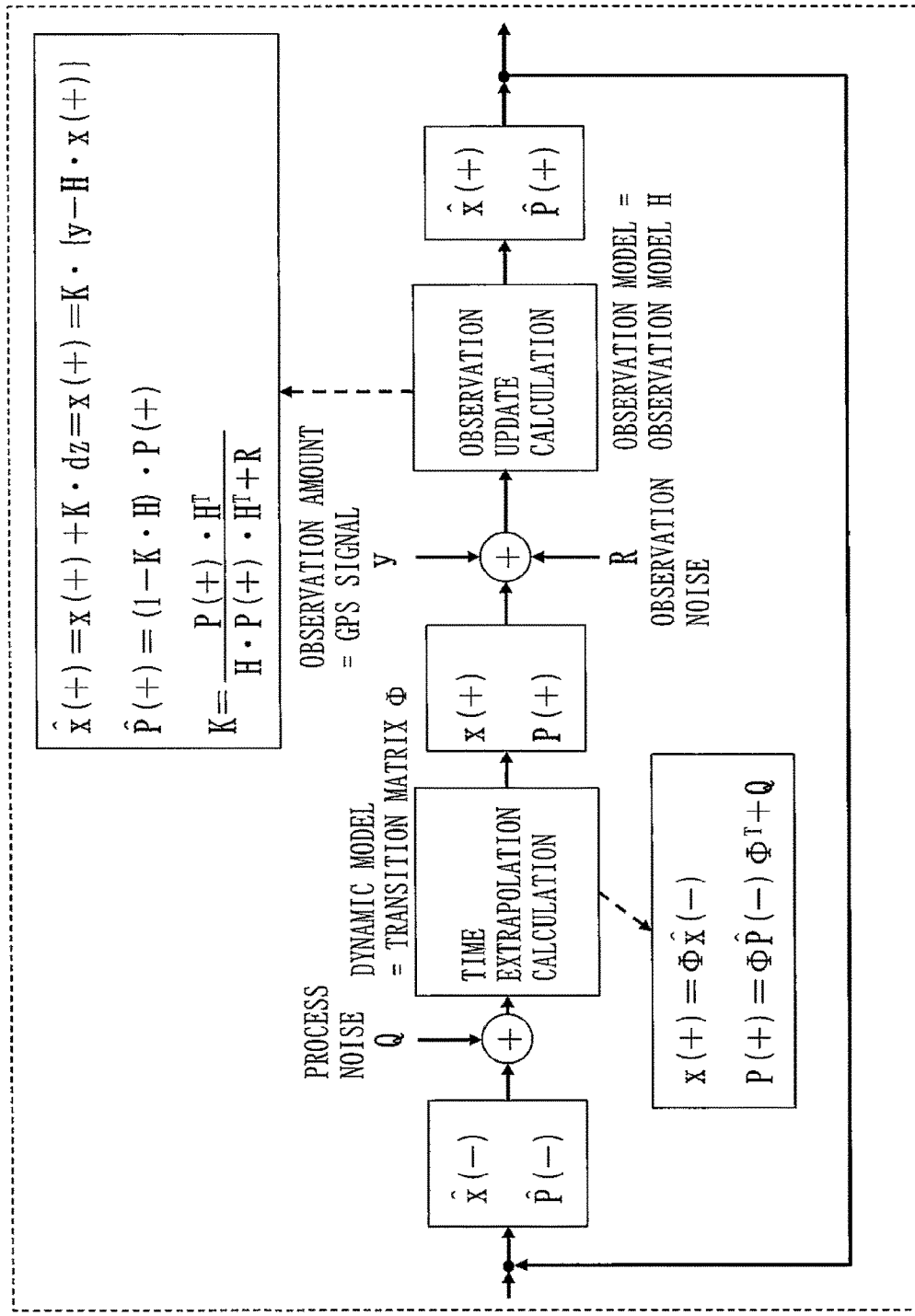
FIG. 14 is a diagram illustrating a processing flow of a Kalman filter according to the first embodiment.

FIG. 14 illustrates a processing flow of the Kalman filter.

FIG. 15 illustrates a description of a variable used in the processing of the Kalman filter.

The time extrapolation calculation unit 105 in FIG. 8 performs time extrapolation calculation of the Kalman filter illustrated in FIG. 14.

Moreover, the observation update calculation unit 108 in FIG. 8 performs observation update calculation of the Kalman filter illustrated in FIG. 14.

The time extrapolation calculation and the observation update calculation form a loop, and the loop formed by the time extrapolation calculation and the observation update calculation is executed repeatedly.

The Kalman filter estimates the state quantity such that a diagonal component of an error covariance (error covariance matrix $P_{ij}=E\langle x_i x_j \rangle$, where $E\langle a \rangle$ is a variance of "a") of the estimated state quantity (state quantity X) to be estimated is the smallest in each loop being repeated.

The processing of the Kalman filter will be described in due order

In the time extrapolation calculation, from a state quantity ($\hat{x}(-)$) and an error covariance matrix ($P\hat{}(-)$) of a previous time, a state quantity ($x(+)$) and an error covariance matrix ($P(+)$) of a following time are estimated based on a transition matrix $\phi$ determined according to a dynamic model being adopted.

At this time, process noise Q that is an error expected between the dynamic model and an actual phenomenon is added to the error covariance matrix ($P\hat{}(-)$).

The process noise Q is also determined according to the adopted dynamic model and design.

From the estimated state quantity ($x(+)$), an amount $\bar{y}$ equivalent to an observation amount ($\bar{y}$ represents that "-" lies directly above "y"; the same applies hereinafter) is obtained, the amount $\bar{y}$ being estimated by an observation model ($\bar{y}=f(x)$) expressing a relationship between the state quantity and the observation amount.

In the observation update calculation, a residual ($dz=y-\bar{y}$) being a difference between an actual observation amount and the estimated observation amount is obtained to then convert it to a difference in the state quantity ($dx=K \cdot dz$) by using Kalman gain K expressed in an expression in FIG. 14 and update the state quantity.

An observation matrix used in the observation update calculation expresses the observation model and is obtained by the following expression.

$$dz = H \cdot dx (dz = y - \bar{y} = f(\hat{x}) - f(x) = \nabla_x f \cdot dx = H \cdot dx) \quad \text{[Expression 1]}$$

Moreover, R included in the denominator of the expression of the Kalman gain K represents observation noise expected to be included in the observation amount.

4.2.3. Ambiguity Calculation

Next, ambiguity calculation performed by the ambiguity calculation unit 109 in FIGS. 8 and 9 will be described.

In order to realize highly accurate positioning, it is conventionally required to perform positioning by using a carrier phase with which the receiver noise is on the order of millimeters (refer to FIG. 4).

The ambiguity being a bias amount is included in the carrier phase but cannot be eliminated by the double difference calculation (refer to section 4.2.1), so that the positioning device 100 needs to estimate the ambiguity by adding the ambiguity to the state quantity (position and velocity) and eliminate the ambiguity.

A procedure of eliminating the ambiguity is described in a list below.

(1) Estimate a position by using the pseudorange (refer to sections 4.2.1 and 4.2.2).

(2) With the geometric distance found from the position obtained in (1), estimate the ambiguity from the carrier phase (refer to section 4.2.1).

(3) Repeat (1) and (2) for a while to make a variance of the state quantity (position, velocity, and ambiguity) statistically small.

(4) Use a method called a LAMBDA method to determine an integer value (called a Fix solution) of the ambiguity (the ambiguity has an integer value; refer to FIG. 4) that has a decimal value (called a Float solution) at the time of step (3).

(5) Verify whether the Fix solution is correct and, when correct, fix the ambiguity to update the position corresponding to the difference between the Float solution and the Fix solution and realize the accuracy on the order of centimeters.

The LAMBDA method is a method of using the Float solution of the ambiguity and an error covariance matrix with a component corresponding to the Float solution as inputs, and searching for the Fix solution that results in the smallest square sum average of the difference between the Float solution and the Fix solution from a hyperdimensional ellipsoid sphere determined by the magnitude of the error covariance with the Float solution as the center.

It is hyperdimensional since the number of Float solutions corresponds to the number of double differences (=number of satellites−1), and the ellipsoid sphere instead of a sphere is used since a non-diagonal component of the error covariance matrix is not zero.

The determination in the verification in (5) is made on the basis of information such as the magnitude of the residual using the Fix solution.

Second Embodiment

The positioning calculation unit 110 illustrated in FIG. 8 will be described in detail in the present embodiment.

First, a problem to be solved by the positioning calculation unit 110 of the present embodiment will be described.

5.1. Problem

The tropospheric delay error and the ionospheric delay error included in the reinforcement information are assigned to the grid point as illustrated in FIG. 16.

Figure 17:
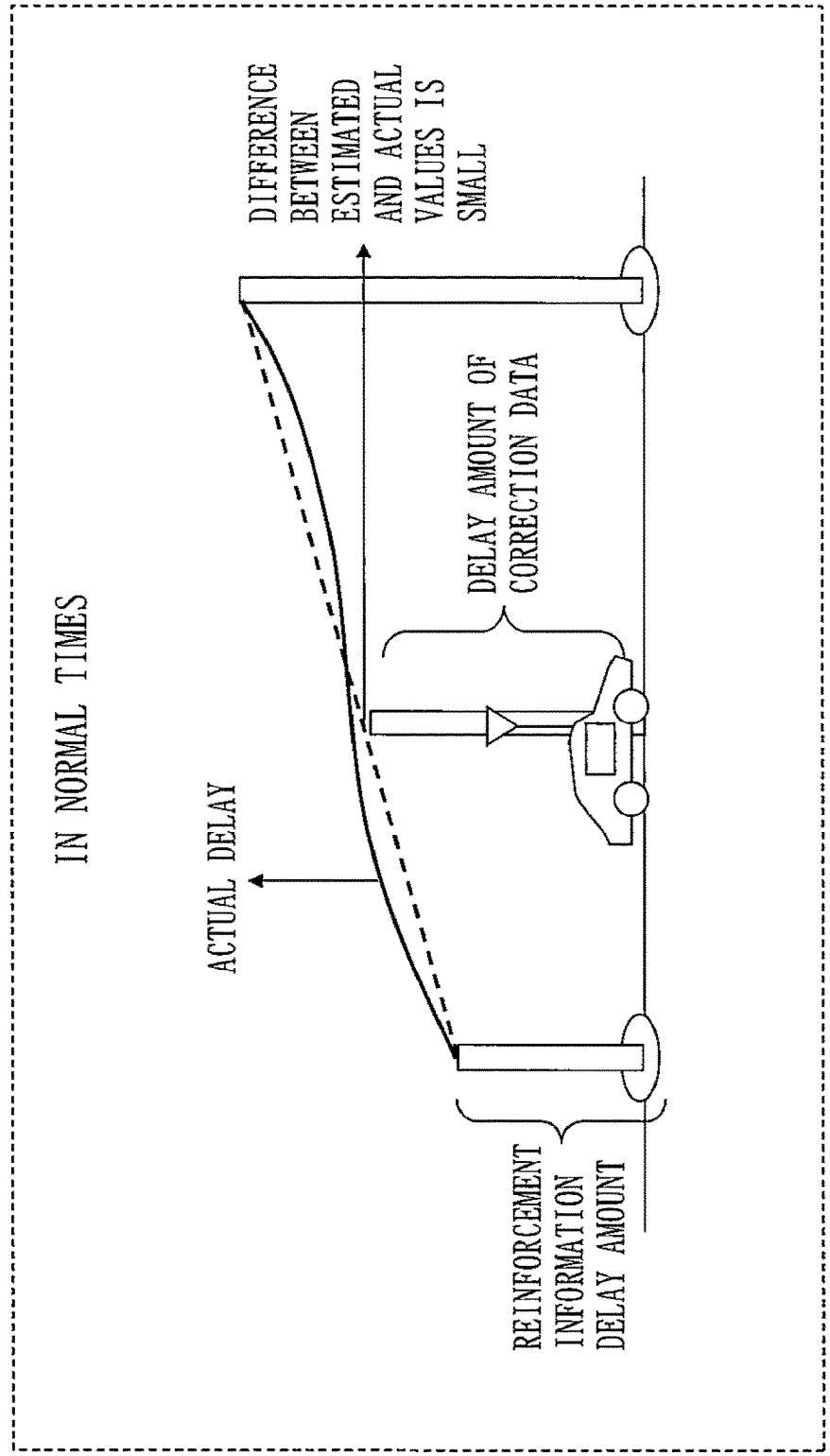
FIG. 17 is a diagram illustrating a difference between an actual delay amount and a delay amount in correction data in normal times according to the second embodiment.

In normal times, as illustrated in FIG. 17, the ionospheric delay error and the tropospheric delay error at the grid point in the vicinity of the positioning point are interpolated to be able to calculate an estimated value of the ionospheric delay error and an estimated value of the tropospheric delay error at the positioning point.

The difference between the estimated value and an actual value is negligible with respect to the positioning accuracy when a spatial fluctuation of the ionospheric delay error and the tropospheric delay error is moderate.

Figure 18:
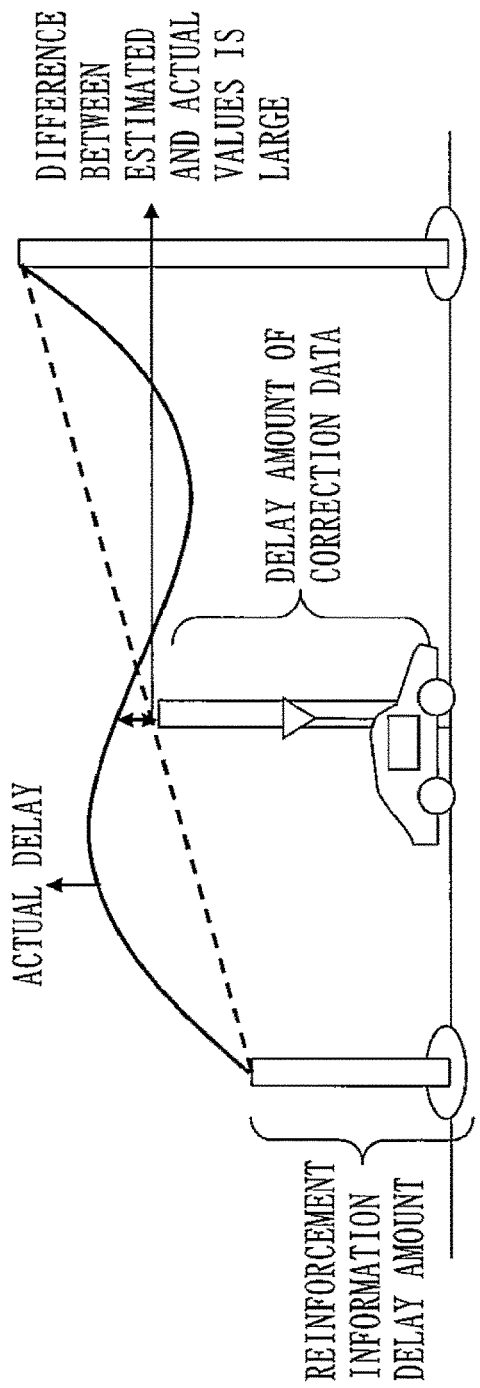
FIG. 18 is a diagram illustrating a difference between an actual delay amount and a delay amount in correction data at the time of a strong ionospheric disturbance or tropospheric disturbance according to the second embodiment.

However, at the time of a strong ionospheric disturbance or tropospheric disturbance (such as when a solar flare occurs, in summertime, or late at night), the difference between the estimated value and the actual value is large as illustrated in FIG. 18, thereby causing degradation in the positioning accuracy.

In the present embodiment, there will be described the positioning calculation unit 110 capable of maintaining highly accurate positioning performance even at the time of the strong ionospheric disturbance or tropospheric disturbance.

5.2. Wide-Lane Ambiguity

When the difference between the estimated value and the actual value is large as illustrated in FIG. 18, an ionospheric error and a tropospheric error remain as they cannot be eliminated from the observation data even when the double difference calculation described in section 4.2.1 and FIGS. 12 and 13 is performed.

The errors remaining after the double difference calculation are called an ionospheric residual and a tropospheric residual.

Each of the ionospheric residual and the tropospheric residual is on the order of approximately one centimeter to 20 centimeters.

The ionospheric residual and tropospheric residual are approximately the same in magnitude as wavelengths of L1-wave ambiguity and L2-wave ambiguity illustrated in FIG. 19, when comparing them. Therefore, in the ambiguity calculation described in section 4.2.3, it takes more time to fix the ambiguity, or the ambiguity is fixed to a wrong integer value.

In the present embodiment, the L1-wave ambiguity and wide-lane (WL) ambiguity (in a far right column in FIG. 19) are adopted as the state quantity instead of the L1-wave ambiguity and the L2-wave ambiguity.

That is, in the positioning calculation unit 110, the time extrapolation calculation unit 105 follows the procedure described in section 4.2.2 to perform time extrapolation calculation on the state quantity $X^{\wedge}(t-\Delta t)$ including the L1-wave ambiguity and the WL ambiguity and estimate the state quantity X(t) including the L1-wave ambiguity and the WL ambiguity.

Moreover, the observation update calculation unit 108 follows the procedure described in section 4.2.2 to update the state quantity X(t) including the L1-wave ambiguity and the WL ambiguity.

The ambiguity calculation unit 109 follows the procedure described in section 4.2.3 to calculate the L1-wave ambiguity and the WL ambiguity.

As illustrated in FIG. 19, the WL ambiguity has a wavelength of approximately 86 centimeters, which is sufficiently large compared to the ionospheric residual and the tropospheric residual so that the ambiguity can be fixed even at the time of the strong ionospheric disturbance or tropospheric disturbance.

The accuracy of position is increased after fixing the WL ambiguity, followed by fixing of the L1 ambiguity so that the time it takes to fix the ambiguity can be reduced.

5.3. Ionospheric Residual and Tropospheric Residual

As described above, when the difference between the estimated value and the actual value is large as illustrated in FIG. 18, the ionospheric residual and the tropospheric residual remain in the observation data even when the double difference calculation described in section 4.2.1 and FIGS. 12 and 13 is performed.

The ionospheric residual and the tropospheric residual are not noise but bias errors (do not equal zero when time-averaged), whereby the ionospheric residual and the tropospheric residual cannot be eliminated by the Kalman filter calculation described in section 4.3.2.

Therefore, the ionospheric residual and the tropospheric residual are reflected in the state quantity as errors, and the positioning accuracy on the order of centimeters cannot be realized.

In the present embodiment, the ionospheric residual and the tropospheric residual are added as an amount to be estimated to the state quantity in the positioning device 100.

Further, in the present embodiment, a dynamic model in the time extrapolation calculation unit 105 and an observation model in the observation update calculation unit 108 are adapted to the ionospheric residual and the tropospheric residual being added to the state quantity.

A conventional state quantity X(t) is made up of the position, velocity, L1-wave ambiguity, and L2-wave ambiguity as illustrated in FIG. 20.

On the other hand, the state quantity X (t) of the present embodiment is made up of the position, velocity, L1-wave ambiguity, WL ambiguity, ionospheric residual and tropospheric residual.

FIG. 21 illustrates details of a dynamic model, a transition matrix and a process noise of the Kalman filter adapted for the state quantity of the present embodiment.

As illustrated in FIG. 21, in the present embodiment, the transition matrix of a Gauss-Markov process is used in the time extrapolation calculation of the ionospheric residual.

The transition matrix of the Gauss-Markov process is also used in the time extrapolation calculation of the tropospheric residual.

Each expression in FIG. 23 represents the observation model adapted for the state quantity of the present embodiment.

FIG. 22 illustrates the observation model adapted for the conventional state quantity.

Expression 4 in FIG. 22 corresponds to expression 2 in FIG. 13, and expression 5 in FIG. 22 corresponds to expression 3 in FIG. 13.

The conventional observation model (FIG. 22) is described in section 8.3 of the following reference.

Moreover, the reference describes characteristics of the ionosphere in section 6.3.2 as well as characteristics of the troposphere and a mapping coefficient in section 6.3.3.

Reference: "Global Positioning System: Theory and Practice", Hofmann-Wellenhof, B., Lichtenegger, H., Collins, J., Translated by Nishi, S., Published by Springer-Verlag Tokyo Compared to the observation model in FIG. 22, an ionospheric residual resI(i) is added in the observation model of the present embodiment as illustrated in FIG. 23. The ionospheric residual resI(i) represents the ionospheric residual of the GPS satellite i.

That is, the ionospheric residual has a difference value for each GPS satellite 300.

A sign (+/−) of the ionospheric residual is different in the pseudorange and the carrier phase due to the characteristics of the ionosphere that cause the ionospheric delay error.

Moreover, the ionospheric residual of the L2 wave is inversely proportional to a square of the frequency, and thus has a value equal to the magnitude of the ionospheric residual of the L1 wave (resI(i)) multiplied by $F(1)^2/F(2)^2$.

Note that F(1) represents a signal frequency of the L1 wave, and F(2) represents a signal frequency of the L2 wave.

With regard to the tropospheric residual, two variables are prepared as the state quantity, the variables including $resT_d$ being a delay amount when a GPS signal passing in the zenith direction passes through dry air and $resT_w$ being a delay amount when a GPS signal passing in the zenith direction passes through wet air.

Then, a multiplied value of a coefficient $m_d(i)$ and $resT_d$ as well as a multiplied value of a coefficient $m_w(i)$ and $resT_w$ are added as the tropospheric residual to all observation data.

In the present embodiment, the time extrapolation calculation unit 105 of the positioning calculation unit 110 follows the procedure described in section 4.2.2 as well as uses the transition matrix of the Gauss-Markov process as illustrated in FIG. 21 to perform the time extrapolation calculation on the state quantity $X^\wedge(t-\Delta t)$ including the ionospheric residual and the tropospheric residual and estimate the state quantity $X(t)$ including the ionospheric residual and the tropospheric residual.

Moreover, the observation update calculation unit 108 follows the procedure described in section 4.2.2 as well as uses the observation model illustrated in FIG. 23 to update the state quantity $X(t)$ including the ionospheric residual and the tropospheric residual.

As a result, the observation update calculation unit 108 outputs a positioning result (position) from which the ionospheric residual and the tropospheric residual are eliminated.

5.4. Pseudo-Observation Amount of Ionospheric Residual and Tropospheric Residual Where n denotes the number of double differences (=the number of satellites−1), n number of each expression in FIG. 23 are required (4×n expressions are required on a whole).

The position and velocity being the estimated values include six components, the L1-wave ambiguity and WL ambiguity include 2×n components, the ionospheric residual includes n components, and the tropospheric residual includes two components.

In order to calculate the estimated value of an unknown quantity from the expression, 4×n≥6+2×n+n+2 needs to be satisfied, thereby requiring n≥8.

The condition n≥8 is a rather stringent condition considering a normal satellite signal receiving environment, where an area and hours satisfying the condition are limited.

In other words, the condition n≥8 has low observability.

Accordingly, in the present embodiment, the observability is increased by adding the following pseudo-observation model of the ionospheric residual and the tropospheric residual to the four expressions in FIG. 23.

$$0 = resI(i)$$

$$0 = resT_d$$

$$0 = resT_w$$

In the three expressions above, "0" on the left side represents a pseudo-observation amount indicating that each of resI(i), $resT_d$, and $resT_w$ can roughly be approximate to zero in an actual phenomenon.

That is, the observation update calculation unit 108 in FIG. 8 performs observation update calculation on the state quantity $X(t)$ while assuming the value of the ionospheric residual and the value of the tropospheric residual included in the double difference residual 156 to both be zero.

The number of "0=resI(i)" corresponds to the number of GPS satellites (that is, n+1 expressions), where n number of "0=resI(i)" are used in the double difference calculation.

The total of n+2 expressions (n number of "0=resI(i)" as well as "0 $resT_d$" and "0=$resT_w$") are added to the aforementioned expression to be able to obtain 4×n+n+2≥6+2×n+n+2 and obtain a condition of n≥3 as a result.

The condition n≥3 is equivalent to the value required in independent positioning and the conventional observation model (FIG. 22) so that sufficient observability can be maintained.

When the ambiguity calculation unit 109 determines the ambiguity by using the observation model of the present embodiment (FIG. 23), "2×n" corresponding to the ambiguity is erased from the right side of the inequality (4×n+n+2≥6+2× n+n+2).

The observation amount on the left side becomes excessive as a result.

Moreover, in order to increase the positioning accuracy by increasing the accuracy of the ionospheric residual and tropospheric residual, it is desired to eliminate the pseudo-observation amount (0=resI(i), 0=$resT_d$, 0=$resT_w$) that is not zero in reality from the observation model.

Accordingly, the observation update calculation unit 108 maximizes a component of observation noise (section 4.3.2 and R in FIG. 14) equivalent to the pseudo-observation model in an epoch after the L1-wave ambiguity and the WL ambiguity are determined by the ambiguity calculation unit 109.

The pseudo-observation amount (0=resI (i), 0=$resT_d$, 0=$resT_w$) can be nullified as a result.

6. Variation

In the first and second embodiments, there has been described the example in which the positioning device 100 receives the low-rate errors at 30 second intervals and the high-rate errors at five second intervals.

However, the low-rate errors need not be received as 30 second intervals, and the high-rate errors need not be received at five second intervals, either.

The time interval may be set to any interval as long as there holds a relationship where the interval at which the high-rate errors are received is 1/n (n is an integer of two or larger) of the interval at which the low-rate errors are received.

Moreover, in the first and second embodiments, there has been described the example in which the positioning device 100 receives, as the value of the frequency-dependent error, the inter-frequency bias (L1 bias), the inter-frequency bias (L2 bias) and the value of the ionospheric delay error.

It may be adapted not to receive the value of the ionospheric delay error, however.

Moreover, in the first and second embodiments, there has been described the example in which the positioning device 100 receives, as the value of the frequency-independent error, the value of the satellite orbit error, the inter-frequency bias (L0 bias and the value of the tropospheric delay error.

It may be adapted not to receive the value of the tropospheric delay error, however.

Moreover, while the second embodiment illustrates the example in which the ionospheric residual and the tropospheric residual are included in the state quantity, it may be adapted to include either one of the ionospheric residual and the tropospheric residual in the state quantity.

While the embodiments of the present invention have been described, two or more of those embodiments may be combined and implemented.

Alternatively, one of those embodiments may be partially implemented.

Yet alternatively, two or more of those embodiments may be partially combined and implemented.

Note that the present invention is not to be limited by those embodiments but can be modified in various manners as needed.

7. Example of Hardware Configuration

Lastly, an example of a hardware configuration of the positioning device 100 according to the first and second embodiments will be described with reference to FIG. 24.

The positioning device 100 is a computer that can implement each element of the positioning device 100 by a program.

The positioning device 100 has the hardware configuration in which an arithmetic device 901, an external storage 902, a main storage 903, a communication device 904 and an input/output device 905 are connected to a bus.

The arithmetic device 901 is a CPU (Central Processing Unit) executing the program.

The external storage 902 is a ROM (Read Only Memory), a flash memory and/or a hard disk device, for example.

The main storage 903 is a RAM (Random Access Memory).

The communication device 904 receives the observation data and the broadcast ephemeris from the GPS satellite and receives the reinforcement information from the quasi-zenith satellite.

The communication device 904 includes an AD (analog-digital) conversion function.

The input/output device 905 is a touch panel display, for example.

The program usually stored in the external storage 902 is sequentially read into the arithmetic device 901 and executed while loaded to the main storage 903.

The program is a program implementing the function that is described as " . . . unit" in FIG. 8.

Moreover, the external storage 902 stores an operating system (OS), at least a part of which is loaded to the main storage 903 so that the arithmetic device 901 executes the program implementing the function of the " . . . unit" in FIG. 8 while executing the OS.

Furthermore, the main storage 903 stores as a file a piece of information, data, a signal value and a variable value representing the result of the processing described as "correction of . . . ", "generation of . . . ", "creation of . . . ", "computation of . . . ", "calculation of . . . ", "determination of . . . ", "evaluation of . . . ", "update of . . . ", "estimation of . . . ", "extraction of . . . ", "selection of . . . ", "reception of . . . " and the like in the first and second embodiments.

Figure 24:
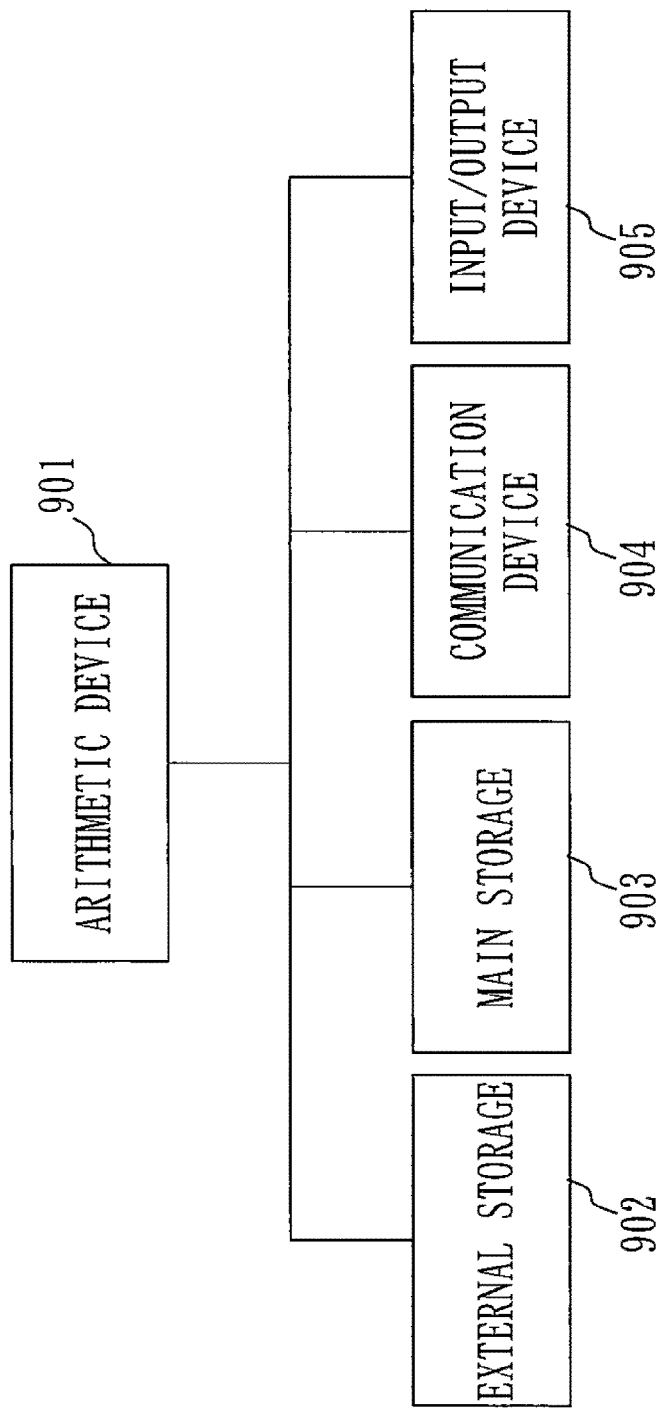
FIG. 24 is a diagram illustrating an example of a hardware configuration of the positioning device according to the first and second embodiments.

Note that the configuration in FIG. 24 merely illustrates an example of the hardware configuration of the positioning device 100, which may thus have the hardware configuration that is not necessarily the configuration illustrated in FIG. 24 but another configuration.

REFERENCE SIGNS LIST

100: positioning device, 101: approximate position/satellite position calculation unit, 102: correction data creation unit, 103: observation data screening unit, 104: observation data error correction unit, 105: time extrapolation calculation unit, 106: geometric distance calculation unit, 107: residual calculation unit, 108: observation update calculation unit, 109: ambiguity calculation unit, 110: positioning calculation unit, 200: quasi-zenith satellite, 300: GPS satellite, 400: reinforcement information, 401: satellite clock error, 402: satellite orbit error, 403: tropospheric delay error, 404: inter-frequency bias (L1 bias), 405: inter-frequency bias (L2 bias), 406: inter-frequency bias (L0 bias), 407: ionospheric delay error, 501: observation data, 502: broadcast ephemeris, 1021: first receiving unit, 1022: frequency-independent error data, 1023: second receiving unit, 1024: frequency-dependent error data, 1025: switch, 1026: frequency-dependent error data, 1027: time extrapolation unit, 1028: frequency-dependent error data, and 1029: data integration unit.

The invention claimed is:

1. A global positioning device comprising:
a receiver configured to receive a value of an error used in satellite positioning at a first time interval and receive a first correction value of the error at a second time interval that is 1/n (n is an integer of two or larger) time interval of the first time interval; and
processing circuitry configured to correct the value of the error at the second time interval using the first correction value, wherein
the receiver is further configured to receive, at the first time interval, a first value of a frequency-dependent error that is an error dependent on a frequency of a carrier from a positioning satellite and a second value of a frequency-independent error that is an error independent of the frequency of the carrier and receive, at the second time interval, a second correction value of the frequency-independent error, and
the processing circuitry is further configured to correct the second value of the frequency-independent error at the second time interval using the second correction value.

2. The global positioning device according to claim 1, wherein the processing circuitry is further configured to
calculate a third correction value of the frequency-dependent error for the second time interval, and
correct, at the second time interval, the second value of the frequency-independent error using the first correction value received by the receiver and the first value of the frequency-dependent error using the calculated third correction value.

3. The global positioning device according to claim 2, wherein
the processing circuitry is further configured to calculate a fourth correction value of the frequency-independent error for the second time interval by linear interpolation that employs time extrapolation.

4. The global positioning device according to claim 1, wherein
the receiver is further configured to
receive, at the first time interval, at least any one of: a value of an inter-frequency bias of an L1 wave, a value of an inter-frequency bias of an L2 wave and a value of an ionospheric delay error as the value of the frequency-dependent error and at least any one of a value of a satellite orbit error, a value of an inter-frequency bias of an L0 wave and a value of a tropospheric delay error as the value of the frequency-independent error, and
receive, at the second time interval, at least any one of: a correction value of the satellite orbit error, a correction value of the inter-frequency bias of the L0 wave and a correction value of the tropospheric delay error as the correction value of the frequency-independent error.

5. The global positioning device according to claim 4, wherein the processing circuitry is further configured to
calculate a third correction value of the inter-frequency bias of the L1 wave for the second time interval, a fourth correction value of the inter-frequency bias of the L2 wave for the second time interval and a fifth correction value of the ionospheric delay error for the second time interval, and
correct, at the second time interval, the frequency-independent error using the first correction value received by the receiver and the frequency-dependent error using a respective one or more of the calculated third, fourth and fifth correction values.

6. The global positioning device according to claim 1, wherein
the receiver is further configured to receive the second correction value of the frequency-independent error together with a satellite clock error at the second time interval.

7. The global positioning device according to claim 1, wherein
the receiver is further configured to receive the value of the error at thirty second intervals and receive the first correction value of the error at five second intervals, and
the processing circuitry is further configured to correct the value of the error at five second intervals using the first correction value.

8. A global positioning device comprising:
processing circuitry configured to perform positioning calculation using a state quantity including at least either an ionospheric residual or a tropospheric residual that remains after error correction processing is performed on observation data from a positioning satellite, wherein
the procession circuitry is further configured to
perform time extrapolation calculation on a state quantity of a past epoch including at least either the ionospheric residual or the tropospheric residual to estimate a state quantity of a current epoch including at least either the ionospheric residual or the tropospheric residual,
calculate a double difference residual using double difference data obtained by double difference calculation on the observation data, a geometric distance between the positioning satellite and the positioning device obtained from the observation data, and the state quantity of the estimated current epoch, and
perform observation update calculation using the double difference residual to update the state quantity of the estimated current epoch.

9. The global positioning device according to claim 8, wherein
the processing circuitry obtains a positioning result from which at least either the ionospheric residual or the tropospheric residual is eliminated.

10. The global positioning device according to claim 8, wherein
the processing circuitry performs positioning calculation by using the state quantity including L1-wave ambiguity and wide-lane ambiguity.

11. The global positioning device according to claim 8, wherein
the processing circuitry is further configured to perform observation update calculation based on an assumption that a value of the ionospheric residual included in the double difference residual is zero to update the state quantity of the estimated current epoch including at least the ionospheric residual.

12. The global positioning device according to claim 8, wherein
the processing circuitry is further configured to perform observation update calculation based on an assumption that a value of the tropospheric residual included in the double difference residual is zero to update the state quantity of the estimated current epoch including at least the tropospheric residual.

13. The global positioning device according to claim 8, wherein
the processing circuitry is further configured to perform observation update calculation by maximizing a value of observation noise after L1-wave ambiguity and wide-lane ambiguity are determined.

14. The global positioning device according to claim 8, wherein
the processing circuitry is further configured to perform time extrapolation calculation using a transition matrix of a Gauss-Markov process.

* * * * *